(12) United States Patent
Nakamura et al.

(10) Patent No.: US 8,553,305 B2
(45) Date of Patent: Oct. 8, 2013

(54) LIGHT DEFLECTING ELEMENT, LIGHT DEFLECTOR, AND IMAGE FORMING DEVICE

(75) Inventors: Makiko Nakamura, Chino (JP); Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 338 days.

(21) Appl. No.: 12/880,605

(22) Filed: Sep. 13, 2010

(65) Prior Publication Data
US 2011/0102870 A1 May 5, 2011

(30) Foreign Application Priority Data

Oct. 20, 2009 (JP) ................................. 2009-241123
Apr. 30, 2010 (JP) ................................. 2010-105742

(51) Int. Cl.
G02B 26/08 (2006.01)

(52) U.S. Cl.
USPC .................................... 359/200.7; 359/214.1

(58) Field of Classification Search
USPC .......... 359/199.3, 200.2, 200.3, 200.7, 213.1, 359/214.1, 221.1
See application file for complete search history.

(56) References Cited

U.S. PATENT DOCUMENTS

| | | | | |
|---|---|---|---|---|
| 4,317,611 A * | 3/1982 | Petersen | .................... | 359/214.1 |
| 6,924,914 B2 | 8/2005 | Kato et al. | | |
| 6,956,684 B2 * | 10/2005 | Orcutt | ........................ | 359/199.1 |
| 6,999,215 B2 * | 2/2006 | Dewa et al. | ................ | 359/198.1 |
| 7,050,211 B2 * | 5/2006 | Orcutt | ........................ | 359/224.1 |
| 7,057,783 B2 * | 6/2006 | Kato et al. | ................. | 359/224.1 |
| 7,529,011 B2 * | 5/2009 | Fujii | .......................... | 359/224.1 |
| 7,639,413 B2 * | 12/2009 | Nishikawa et al. | ........ | 359/224.1 |
| 8,274,723 B2 * | 9/2012 | Sakakibara | ............... | 359/224.1 |
| 2002/0060830 A1 * | 5/2002 | Miyajima et al. | ............ | 359/224 |
| 2002/0114053 A1 | 8/2002 | Yasuda et al. | | |
| 2002/0135850 A1 * | 9/2002 | Hagelin et al. | ................ | 359/224 |
| 2004/0070816 A1 | 4/2004 | Kato et al. | | |
| 2004/0075522 A1 | 4/2004 | Kato et al. | | |
| 2005/0046918 A1 | 3/2005 | Yasuda et al. | | |
| 2005/0134951 A1 * | 6/2005 | Mi et al. | ........................ | 359/198 |
| 2005/0157363 A1 * | 7/2005 | Orcutt | .......................... | 359/224 |
| 2005/0179985 A1 | 8/2005 | Kato et al. | | |
| 2006/0152106 A1 * | 7/2006 | Yan et al. | ...................... | 310/309 |
| 2006/0209378 A1 | 9/2006 | Yasuda et al. | | |
| 2007/0115526 A1 * | 5/2007 | Kato et al. | ................... | 359/198 |
| 2007/0242328 A1 | 10/2007 | Yasuda et al. | | |
| 2007/0273946 A1 * | 11/2007 | Kato et al. | ................... | 359/199 |
| 2007/0291343 A1 * | 12/2007 | Kato et al. | ................... | 359/198 |

FOREIGN PATENT DOCUMENTS

| | | |
|---|---|---|
| JP | 2002-321197 A | 11/2002 |
| JP | 2003-131161 | 5/2003 |
| JP | 2004-034256 A | 2/2004 |
| JP | 2004-037987 A | 2/2004 |
| JP | 2005-300927 | 10/2005 |

* cited by examiner

*Primary Examiner* — Frank Font
(74) *Attorney, Agent, or Firm* — Harness, Dickey & Pierce, P.L.C.

(57) ABSTRACT

A light deflecting element includes: a movable plate provided with a light reflecting section having light reflectivity; a support section; a coupling section adapted to couple the movable plate rotatably to the support section; and a magnet disposed on an opposite surface of the movable plate to the light reflecting section, wherein the coupling section has a shape having a width gradually increasing in a direction from a side of the light reflecting section toward a side of the magnet in a cross-sectional view perpendicular to a rotational axis of the movable plate.

10 Claims, 7 Drawing Sheets

LIGHT DEFLECTING ELEMENT, LIGHT DEFLECTOR, AND IMAGE FORMING DEVICE

BACKGROUND

1. Technical Field

The present invention relates to a light deflecting element, a light deflector equipped with a light deflecting element, and an image forming device equipped with a light deflector.

2. Related Art

In the past, there has been known a light deflector rotating a reflecting surface to thereby deflect a light beam entering the reflecting surface from a light source, with a deflected light beam scanning on an image forming surface to form an image on the image forming surface. In order for forming a high-resolution image, it is required to rotate the reflecting surface at a higher frequency. Mirror devices manufactured applying a technology of micro-electromechanical system (MEMS) can be driven at a frequency so high that polygon mirrors or galvanometer mirrors driven at that frequency can hardly be realized. The mirror device is a light deflector provided with a movable plate to which a reflecting surface is provided or attached, a torsion beam having elasticity, and a drive source, and reciprocally rotates the reflecting surface around the torsion beam as an axis to thereby deflect the light beam entering the reflecting surface from the light source.

The movable plate is required to be rotated at a high speed and with high accuracy. However, the high-speed rotation might cause deformation called "dynamic deflection" due to the inertia moment of the movable plate itself, and the dynamic deflection damages the flatness of the reflecting surface to thereby degrade the image formed.

JP-A-2005-300927 (Document 1) discloses a deflecting mirror, a light scanning device, and an image forming device, in which the distribution of the thickness of a mirror substrate (a movable plate) is set appropriately, thereby making the rigidity distribution of the mirror substrate from a rotational center beam of the mirror substrate along a direction perpendicular to the rotational axis correspond to the distribution of the bending moment, which causes the dynamic deflection, to thereby reduce the dynamic deflection of the mirror substrate, and at the same time, reduce the inertia of the mirror substrate, thus making it possible to enlarge the deflection angle.

JP-A-2003-131161 (Document 2) discloses a light deflector, a method of manufacturing the same, an optical device using the same, and a torsionally oscillating member in which at least one of the surfaces, which is located on the reverse side of the reflecting surface of the movable plate and on the both sides across the torsion shaft, is provided with a recessed section, thereby making it possible to reduce the inertial force while preventing the rigidity from decreasing.

However, the junction between the movable plate and the torsion beam is a portion for transmitting the force for deforming the torsion beam caused by shaking the movable plate and the counter force caused by the torsion beam thus deformed between the torsion beam and the movable plate, and therefore, the force the Document 1 and the Document 2 fail to discuss is applied thereto. The stress caused by this force causes the deflection the Document 1 and the Document 2 fail to discuss, which makes the deflection shape in the vicinity of the root thereof different. Therefore, there is a problem that it is difficult to sufficiently reduce the dynamic deflection of the movable plate by the method of reducing the dynamic deflection described in the Document 1 and the Document 2 alone.

Specifically, in the past, there has been a problem that the stress caused in the junction between the movable plate and the torsion beam is different between one and the other of the sides of the movable plate depending on the cross-sectional shape of the torsion beam, as a result, and the stress causes the deflection of the movable plate.

SUMMARY

An advantage of some aspects of the invention is to provide a solution to at least a part of the problem described above, and the invention can be embodied as forms or application examples described below.

APPLICATION EXAMPLE 1

According to this application example of the invention, there is provided a light deflecting element including, a movable plate provided with a light reflecting section having light reflectivity, a support section, a coupling section adapted to couple the movable plate rotatably to the support section, and a magnet disposed on an opposite surface of the movable plate to the light reflecting section, wherein the coupling section has a shape having a width gradually increasing in a direction from a side of the light reflecting section toward a side of the magnet in a cross-sectional view perpendicular to a rotational axis of the movable plate.

According to the light deflecting element of this application example of the invention, the width of the coupling section on the side of the magnet is larger than the width of the coupling section on the side of the light reflecting section. When the movable plate is rotated, the coupling section is twisted so that each section of the coupling section is deformed, and the stress corresponding to the amount of deformation is caused. Since in the cross-sectional shape of the coupling section, the width on the side of the magnet is larger than the width on the side of the light reflecting section, the stress caused at both ends of the coupling section on the side of the magnet in the width direction becomes the largest. The deflection of the movable plate under the influence of the stress caused in the coupling section becomes larger on the side of the magnet than on the side of the light reflecting section. The magnet is generally made of a material with higher rigidity than that of the movable plate. Therefore, the movable plate is made to be difficult to deform on the side of the magnet due to the rigidity of the magnet. By setting the side on which the deflection of the movable plate due to the stress caused in the coupling section becomes large to be the side on which the movable plate is difficult to deform, the deflection of the movable plate can be reduced as a whole.

APPLICATION EXAMPLE 2

According to this application example of the invention, there is provided a light deflecting element including, a movable plate provided with a light reflecting section having light reflectivity, a support section, a coupling section adapted to couple the movable plate rotatably to the support section, and composed mainly of a plurality of beams parallel to each other, and a magnet disposed on an opposite surface of the movable plate to the light reflecting section, wherein the plurality of beams of the coupling section is arranged side-by-side in a direction parallel to the light reflecting section and has a shape having a total length of widths of the respective beams and distances between adjacent ones of the beams in the direction parallel to the light reflecting section gradually increasing in a direction from a side of the light reflecting section toward a side of the magnet in a cross-sectional view perpendicular to a rotational axis of the movable plate.

According to the light deflecting element of this application example of the invention, by setting the side on which the deflection of the movable plate due to the stress caused in the coupling section becomes large to be the side on which the movable plate is difficult to deform, the deflection of the movable plate can be reduced as a whole. Further, the coupling section is divided into a plurality of beams. The rotational frequency (the resonant frequency) of the movable plate in the light deflecting element is a constant value, and the spring constant of the coupling section is a value uniquely determined by the weight and the rotational frequency of the movable plate. In the case in which the spring constant is achieved by a plurality of beams, the spring constant of each of the beams becomes smaller than that of the coupling section in the case of achieving the spring constant with a single beam. Thus, it becomes possible to reduce the length of the coupling section compared to the coupling section formed of a single beam. By reducing the length of the coupling section, the light deflecting element can be made smaller.

APPLICATION EXAMPLE 3

In the light deflecting element of the above application example of the invention, it is preferable that the plurality of beams includes a first beam and a second beam opposed to each other via the rotational axis of the movable plate, and parallel to each other, and the first beam and the second beam have shapes tilted so that a distance from each other gradually increases in a direction from the side of the light reflecting section toward the side of the magnet in the cross-sectional view perpendicular to the rotational axis of the movable plate.

According to the light deflecting element of this application example of the invention, the coupling section having the larger width on the side of the magnet compared to the width on the side of the light reflecting section can be realized with the first and the second beams.

APPLICATION EXAMPLE 4

In the light deflecting element of the above application example of the invention, it is preferable that the movable plate and the coupling section are made of single crystal silicon.

According to the light deflecting element of this application example of the invention, the movable plate and the coupling section can be formed integrally and at substantially the same time by etching the single crystal silicon material. Further, by forming these constituents integrally, an assemble process can be eliminated to thereby prevent strength degradation in the junction, for example, from occurring.

APPLICATION EXAMPLE 5

In the light deflecting element of the above application example of the invention, it is preferable that both plate surfaces of the movable plate are each formed of a (100) plane of the single crystal silicon, and the coupling section is formed of a (100) plane and a (111) plane of the single crystal silicon.

According to the light deflecting element of this application example of the invention, each of the surfaces of the light deflecting element is formed efficiently with accuracy using the fact that single crystal silicon is apt to be etched along the (100) plane and the (111) plane, and thus, the light deflecting element can be formed efficiently with accuracy.

APPLICATION EXAMPLE 6

In the light deflecting element of the above application example of the invention, it is preferable that the coupling section has surfaces formed continuously so as to be in the same planes with the both plate surfaces of the movable plate, respectively.

According to the light deflecting element of this application example of the invention, it is possible to prevent the stress caused between the movable plate and the coupling section.

APPLICATION EXAMPLE 7

In the light deflecting element of the above application example of the invention, it is preferable that the movable plate has a portion having a width gradually decreasing in a direction from the side of the light reflecting section toward the side of the magnet in a cross-sectional view perpendicular to the rotational axis of the movable plate.

According to the light deflecting element of this application example of the invention, it is possible to reduce the mass of the movable plate without reducing the area of the surface of the movable plate on the side of the light reflecting section, thereby reducing the inertia moment of the movable plate.

APPLICATION EXAMPLE 8

In the light deflecting element of the application example of the invention, it is preferable that the movable plate has a recessed section on a surface opposite to the light reflecting section, and at least a part of the magnet is disposed inside the recessed section.

According to the light deflecting element of this application example of the invention, it is possible to reduce the mass of the movable plate to thereby reduce the inertia moment of the movable plate. Further, it is possible to move the center of gravity of the magnet closer to the rotational center axis of the movable plate. As a result, it is possible to reduce the inertia moment about the rotational axis of the movable plate and the magnet.

APPLICATION EXAMPLE 9

In the light deflecting element of this application example of the invention, it is preferable that the magnet is a permanent magnet.

According to the light deflecting element of this application example of the invention, by generating a magnetic field with the coil disposed so as to be opposed to the movable plate, for example, it is possible to reciprocally rotate the movable plate.

APPLICATION EXAMPLE 10

According to this application example of the invention, there is provided a light deflector including the light deflecting element described in any one of the application examples of the invention described above.

According to the light deflector of this application example of the invention, by setting the side on which the deflection of the movable plate due to the stress caused in the coupling section becomes large to be the side on which the movable plate is difficult to deform, the deflection of the movable plate can be reduced as a whole.

APPLICATION EXAMPLE 11

According to this application example of the invention, there is provided an image forming device including a light emitting section adapted to emit light, and the light deflector described in the above application example of the invention, wherein the image forming device forms an image by scanning the light, which is emitted from the light emitting section, with the light deflector.

According to the image forming device of this application example of the invention, it is possible to prevent the degradation of the image caused by the deflection of the movable plate to thereby form a high-quality image in stable manner.

APPLICATION EXAMPLE 12

According to this application example of the invention, there is provided a light deflector including a light deflecting element having a movable plate having a plate-like shape, to which a reflecting section is fixed, the reflecting section being provided with a reflecting surface adapted to reflect a light beam, an elastic support beam having one end connected to an end surface of the movable plate, and adapted to support the movable plate rotatably around a rotational axis parallel to the reflecting surface, and a support frame to which another end of the elastic support beam on an opposite side to the one end is connected, and adapted to support the elastic support beam, and a drive source adapted to rotate the movable plate, wherein a drive source disposition section to which a drive source element constituting the drive source is disposed is disposed to a movable plate reverse surface on an opposite side of the movable plate to a movable plate adverse surface provided with the reflecting surface, and a cross-sectional shape of the elastic support beam in a cross-sectional surface perpendicular to the rotational axis is a shape in which a width of a beam reverse surface on a side of the movable plate reverse surface is larger than a width of a beam adverse surface on a side of the movable plate adverse surface.

According to the light deflector of this application example of the invention, in the elastic support beam, it is arranged that the width of the beam reverse surface is larger than the width of the beam adverse surface. When the movable plate is rotated, the elastic support beam is twisted so that each section of the elastic support beam is deformed, and the stress proportional to the amount of deformation is caused. Since in the cross-sectional shape of the elastic support beam, the width of the beam reverse surface is larger than the width of the beam adverse surface, the stress caused at both ends of the beam reverse surface becomes the largest. The deflection of the movable plate under the influence of the stress caused in the elastic support beam becomes larger on the side of the movable plate reverse surface closer to the beam reverse surface than on the side of the movable plate adverse surface. The movable plate reverse surface is provided with the drive source disposition section, and the drive source element is disposed to the drive source disposition section and is then fixed to the drive source disposition section. The drive source element is, for example, a magnet, and is generally made of a material with higher rigidity than that of the movable plate. Therefore, the movable plate is made to be difficult to deform on the side of the movable plate reverse surface due to the rigidity of the drive source element fixed to the movable plate reverse surface. By setting the side on which the deflection of the movable plate due to the stress caused in the elastic support beam becomes large to be the side on which the movable plate is difficult to deform, the deflection of the movable plate can be reduced as a whole.

APPLICATION EXAMPLE 13

In the light deflector of the above application example of the invention, it is preferable that the elastic support beam is mainly composed of a plurality of sub-support beams, the width of the beam adverse surface is defined as a width obtained by adding widths of surfaces of the sub-support beams on the side of the movable plate adverse surface (hereinafter referred to as sub-beam adverse surfaces) and distances between adjacent ones of the sub-beam adverse surfaces in a direction parallel to the reflecting surface, and the width of the beam reverse surface is defined as a width obtained by adding widths of surfaces of the sub-support beams on the side of the movable plate reverse surface (hereinafter referred to as sub-beam reverse surfaces) and distances between adjacent ones of the sub-beam reverse surfaces in the direction parallel to the reflecting surface.

According to the light deflector of this application example of the invention, the elastic support beam is divided into a plurality of sub-support beams. The rotational frequency of the movable plate in the light deflecting element is a constant value, and the spring constant value of the elastic support beam is a value uniquely determined by the weight and the rotational frequency of the movable plate. In the case in which the spring constant is achieved by a plurality of sub-support beams, the spring constant of each of the sub-support beams becomes smaller than that of the elastic support beam in the case of achieving the spring constant with a single elastic support beam. Thus, the length of the plurality of sub-support beams can be reduced compared to the case of the single elastic support beam. By reducing the length of the sub-support beam, the light deflecting element can be made smaller.

APPLICATION EXAMPLE 14

In the light deflector of the above application example of the invention, it is preferable that each of the plurality of sub-support beams includes a first sub-support beam having the sub-beam adverse surface and the sub-beam reverse surface substantially parallel to the reflecting surface and, a first beam side surface and a second beam side surface, the first beam side surface and the second beam side surface each having an adverse connection section with the sub-beam adverse surface and a reverse connection section with the sub-beam reverse surface, the adverse connection section being located closer to an axial plane, which is perpendicular to the reflecting surface and includes the rotational axis, than the reverse connection section, and a second sub-support beam having a cross-sectional shape symmetrical to that of the first sub-support beam with respect to the axial plane.

According to the light deflector of this application example of the invention, each of the plurality of sub-support beams is provided with the first sub-support beam and the second sub-support beam. The first sub-support beam has the first beam side surface and the second beam side surface each having the connection section with the sub-beam adverse surface at a position closer than the connection section with the sub-beam reverse surface, and the second sub-support beam has a cross-sectional shape symmetrical to that of the first sub-support beam with respect to the axial plane. Thus, the elastic support beam having a larger width on the side of the movable plate reverse surface than a width on the side of the movable plate adverse surface can be constituted with the first sub-support beam and the second sub-support beam.

APPLICATION EXAMPLE 15

In the light deflector of the above application example of the invention, it is preferable that the movable plate and the elastic support beam are formed integrally with single crystal silicon.

According to the light deflector of this application example of the invention, the movable plate and the elastic support beam can be formed at substantially the same time by etching the single crystal silicon material. Further, by forming these constituents integrally, an assemble process can be eliminated to thereby prevent strength degradation in the junction, for example, from occurring.

APPLICATION EXAMPLE 16

In the light deflector of the above application example of the invention, it is preferable that the movable plate adverse surface, the movable plate reverse surface, the beam adverse surface, the beam reverse surface, the sub-beam adverse surface, and the sub-beam reverse surface are formed of a (100) plane of a silicon crystal, and the two beam side surfaces connecting the beam adverse surface and the beam reverse surface to each other in the elastic support beam, the first beam side surface, the second beam side surface, the surfaces in the second sub-support beam located at positions symmetrical to the first beam side surface and the second beam side surface with respect to the axial plane, are formed of a (111) plane of the silicon crystal.

According to the light deflector of this application example of the invention, the surfaces of the light deflecting element are formed of the (100) plane and the (111) plane of the silicon crystal. Thus, each of the surfaces of the light deflecting element is formed efficiently with accuracy using the fact that single crystal silicon is apt to be etched along the (100) plane and the (111) plane, and thus, the light deflecting element can be formed efficiently with accuracy.

APPLICATION EXAMPLE 17

In the light deflector of the above application example of the invention, it is preferable that the movable plate adverse surface and the beam adverse surface (or the sub-beam adverse surface) are formed in substantially the same plane, and the movable plate reverse surface and the beam reverse surface (or the sub-beam reverse surface) are formed in substantially the same plane.

According to the light deflector of this application example of the invention, each of the pairs of movable plate adverse surface and the beam adverse surface, the movable plate adverse surface and the sub-beam adverse surface, the movable plate reverse surface and the beam reverse surface, and the movable plate reverse surface and the sub-beam reverse surface is in substantially the same plane. Thus, since no steps exist in the boundaries, it is possible to substantially prevent the stress concentration in the corner portion of the steps from occurring, and to prevent large stress from being caused.

APPLICATION EXAMPLE 18

In the light deflector of the above application example of the invention, it is preferable that a side surface of the movable plate having a plate-like shape is provided with a recessed section extending in substantially parallel to the movable plate adverse surface and the movable plate reverse surface.

According to the light deflector of this application example of the invention, by providing the recessed section to the side surface, it is possible to reduce the weight corresponding to the recessed section to thereby reduce the inertia moment of the movable plate without reducing the area of the movable plate adverse surface of the movable plate.

APPLICATION EXAMPLE 19

In the light deflector of the above application example of the invention, it is preferable that the drive source disposition section is a recessed section provided to the movable plate reverse surface, and the drive source element is disposed in the recessed section.

According to the light deflector of this application example of the invention, by providing the recessed section to the movable plate reverse surface as the drive source disposition section, it is possible to reduce the weight corresponding to the recessed section to thereby reduce the inertia moment of the movable plate. The drive source element is a member with a specific gravity larger than that of silicon, such as a magnet. By disposing the member with a large specific gravity in the recessed section provided to the movable plate reverse surface, it becomes possible to dispose the member with a large specific gravity at a position closer to the rotational center axis of the movable plate compared to the configuration of disposing it on the movable plate reverse surface, and thus, the inertia moment of the unit including the movable plate and the drive source element about the rotational center axis can be reduced.

APPLICATION EXAMPLE 20

In the light deflector of the above application example of the invention, it is preferable that the drive source is provided with a permanent magnet and a coil, and the drive source element is one of the permanent magnet and the coil.

According to the light deflector of this application example of the invention, one of the permanent magnet and the coil disposed in the drive source disposition section and the other of the permanent magnet and the coil disposed in the housing to which the light deflector is attached, for example, cooperate with each other, thereby making it possible to rotate the movable plate reciprocally.

APPLICATION EXAMPLE 21

According to this application example of the invention, there is provided an image forming device including alight source, and the light deflector equipped with the light deflecting element according to either one of the application examples described above or the light deflector according to either one of the application examples described above, wherein the image forming device makes the light deflector equipped with the light deflecting element described above or the light deflector described above deflect the light beam emitted from the light source to thereby form an image.

According to the image forming device of this application example of the invention, by incorporating the light deflector equipped with the light deflecting element capable of reducing the deflection of the movable plate as a whole, or the light deflector capable of reducing the deflection of the movable plate as a whole, it is possible to prevent the degradation of an image due to the deflection of the movable plate to thereby form a high-quality image in a stable manner.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
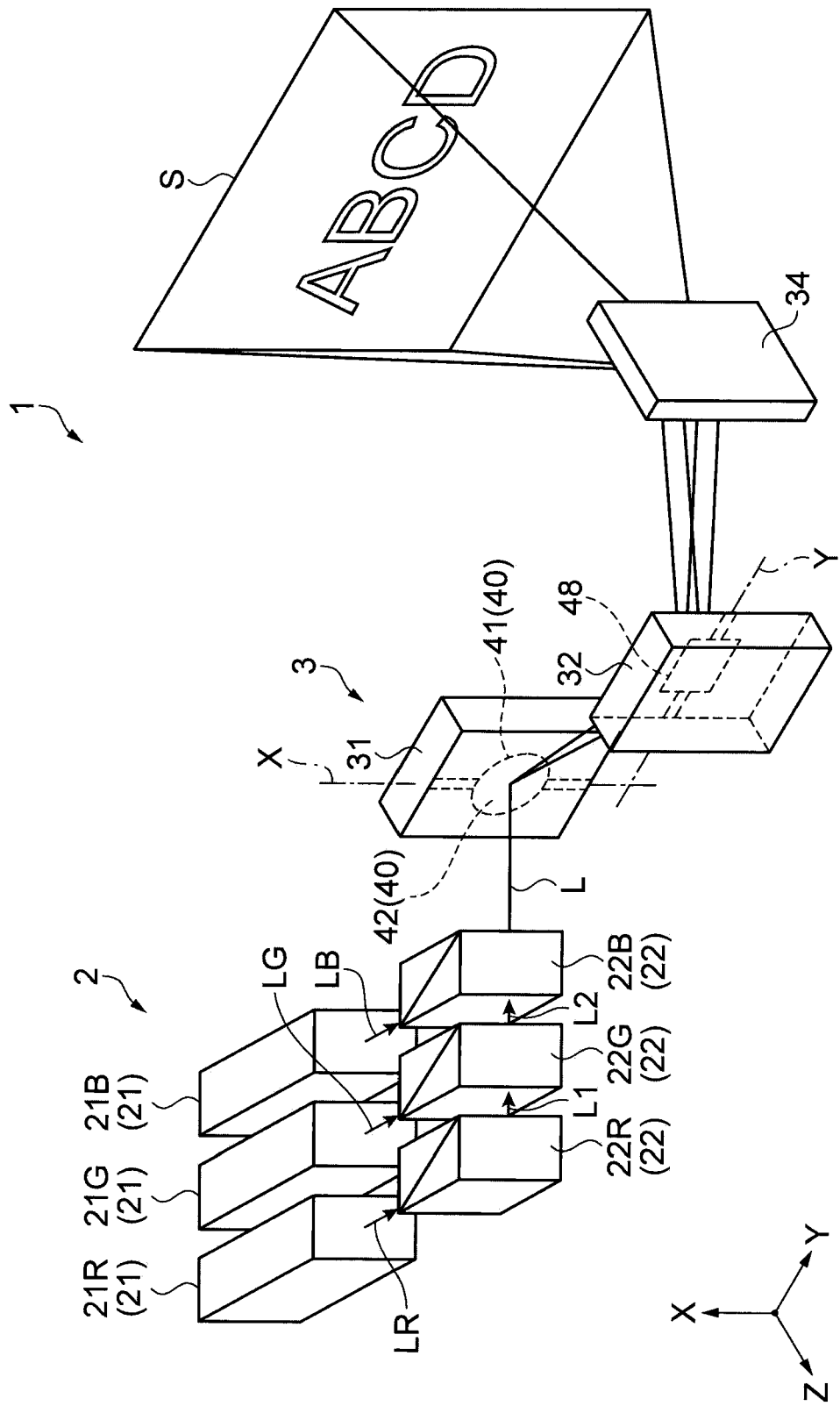
FIG. 1 is an explanatory diagram showing principal constituents of a projection image display device.

Hereinafter, some embodiments of a light deflecting element, a light deflector, and an image forming device will be explained with reference to the accompanying drawings. The present embodiment will be explained taking a projection image display device, which is equipped with a main scanning deflector having a light deflecting element and corresponds to the image forming device equipped with the light deflector having the light deflecting element, as an example. It should be noted that, in the drawings to be referred to in the following explanation, there are some cases in which members or portions are shown with the different horizontal-to-vertical ratio from the actual ratio for the sake of illustration.

Projection Image Display Device

Firstly, a projection image display device 1 will be explained with reference to FIG. 1. FIG. 1 is an explanatory diagram showing principal constituents of the projection image display device.

As shown in FIG. 1, the projection image display device 1 is a device for scanning a light beam L two-dimensionally in the lateral direction (a main scanning direction) and the vertical direction (a sub-scanning direction) of the screen S to thereby form (draw) an image on the screen S.

The projection image display device 1 is provided with a light source unit 2, a light scanning unit 3, and a display device control section omitted from the illustration. The light beam L is emitted from the light source unit 2, and then scanned by the light scanning unit 3 two-dimensionally to be projected on the screen S, and thus, an image is formed on the screen S.

It should be noted that the screen S can be provided integrally to the projection image display device 1, or provided separately. Further, it is also possible to configure that the image is viewed on the adverse side (the side irradiated with the light beam L) of the screen S, or that the image is viewed from the reverse side (the opposite side to the side irradiated with the light beam L) of the screen S.

The light source unit 2 is provided with laser sources 21 and dichroic prisms 22. The laser sources 21 correspond to a laser source 21R, a laser source 21G, and a laser source 21B for emitting either one of light beams of three colors. The laser source 21R emits a red light beam LR, the laser source 21G emits a green light beam LG, and the laser source 21B emits a blue light beam LB.

The dichroic prisms 22 correspond to a dichroic prism 22R, a dichroic prism 22G, and a dichroic prism 22B for selectively reflecting either one of the light beams of the three colors. The dichroic prism 22R is provided with a reflecting section for selectively reflecting the red light beam. The red light beam LR emitted from the laser source 21R enters the dichroic prism 22R, and is then reflected by the reflecting section and emitted toward the dichroic prism 22G. This light beam is denoted as a light beam L1.

The dichroic prism 22G is provided with a reflecting section for selectively reflecting the green light beam. The green light beam LG emitted from the laser source 21G enters the dichroic prism 22G, and is then reflected by the reflecting section and emitted toward the dichroic prism 22B. The light beam L1 emitted from the dichroic prism 22R toward the dichroic prism 22G is transmitted through the reflecting section of the dichroic prism 22G, and then emitted toward the dichroic prism 22B. By the dichroic prism 22G reflecting the light beam LG and transmitting the light beam L1, a light beam L2 obtained by combining the light beam LG and the light beam L1 is emitted toward the dichroic prism 22B.

The dichroic prism 22B is provided with a reflecting section for selectively reflecting the blue light beam. The blue light beam LB emitted from the laser source 21B enters the dichroic prism 22B, and is then reflected by the reflecting section and emitted therefrom. The light beam L2 emitted from the dichroic prism 22G toward the dichroic prism 22B is transmitted through the reflecting section of the dichroic prism 22B, and then emitted therefrom. By the dichroic prism 22B reflecting the light beam LB and transmitting the light beam L2, the light beam L obtained by combining the light beam LB and the light beam L2 is emitted. The light beam L is a light beam obtained by combining the light beam LR, the light beam LG, and the light beam LB of the respective three colors.

The light scanning unit 3 is provided with a main scanning deflector 31, a sub-scanning deflector 32, and a fixed reflecting mirror 34.

The main scanning deflector 31 is provided with a light deflecting element 40, and the light deflecting element 40 is provided with a reflecting mirror 42 fixed to a movable plate 41 rotating around a rotational axis X as the rotational axis (the rotational center axis).

The light beam L emitted from the dichroic prism 22B of the light source unit 2 is reflected by the reflecting mirror 42 to thereby be scanned in the main scanning direction substantially perpendicular to the axial direction of the rotational axis X. The light source unit 2 or the laser source 21 corresponds to the light source (the light emitting section). The main scanning deflector 31 corresponds to the light deflector.

The sub-scanning deflector 32 is formed of, for example, a galvanometer mirror, and is provided with a sub-scanning reflecting mirror 48 rotating around a rotational axis Y substantially parallel to the main scanning direction as the rotational axis.

The light beam L reflected by the reflecting mirror 42 of the main scanning deflector 31 is further reflected by the sub-scanning reflecting mirror 48 to thereby be scanned in the sub-scanning direction substantially perpendicular to the main scanning direction.

The light beam L reflected by the sub-scanning reflecting mirror 48 is then reflected by the fixed reflecting mirror 34 to thereby be emitted toward the screen S. Due to the scanning in the main scanning direction by the main scanning deflector 31 and the scanning in the sub-scanning direction by the sub-scanning deflector 32, a two-dimensional image is formed on the screen S.

Light Deflecting Element

Figure 2A:
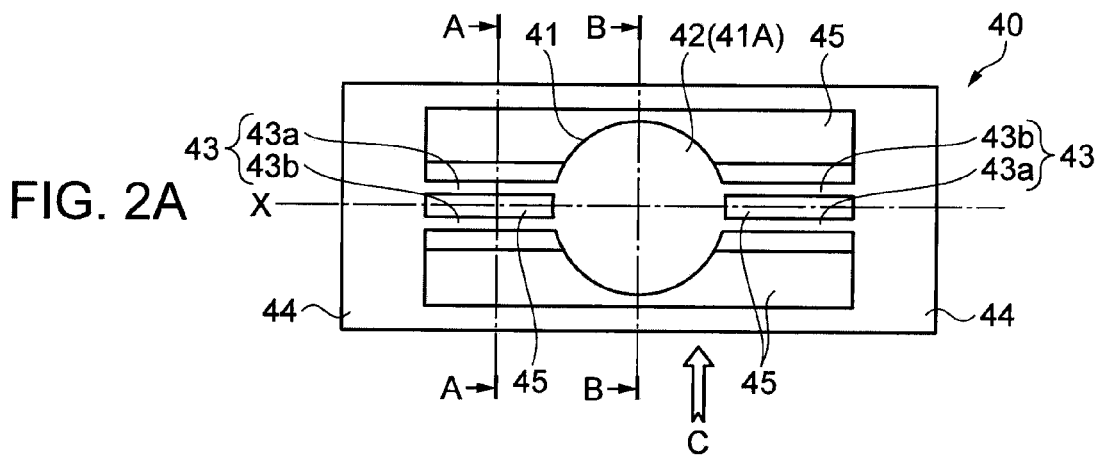
FIG. 2A is a plan view showing a shape of a light deflecting element.
Figure 2B:
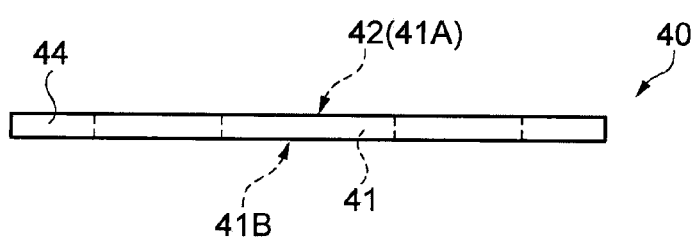
FIG. 2B is a side view thereof viewed from the direction indicated by the arrow C in FIG. 2A.
Figure 2C:
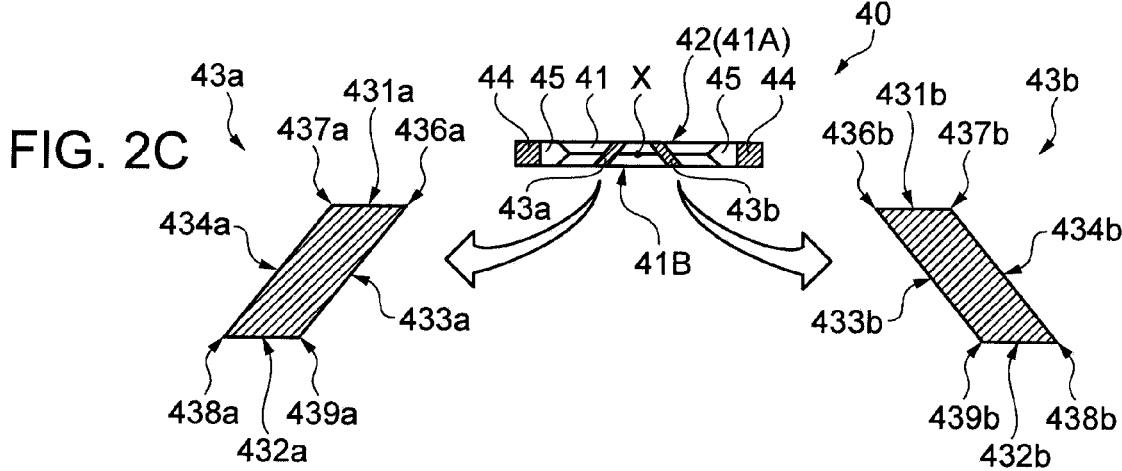
FIG. 2C is a cross-sectional view thereof in the cross-sectional surface indicated by the line A-A in FIG. 2A.
Figure 2D:
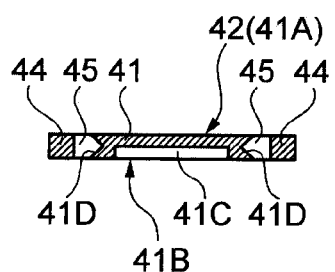
FIG. 2D is a cross-sectional view thereof in the cross-sectional surface indicated by the line B-B in FIG. 2A.
Figure 2E:
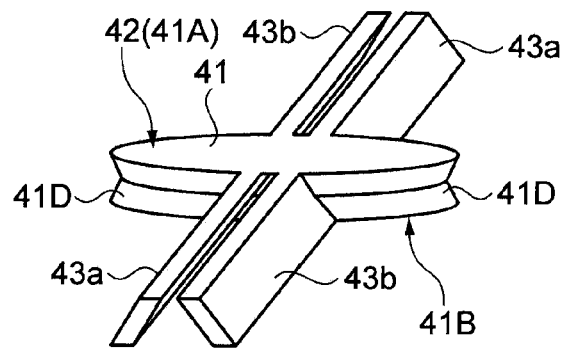
FIG. 2E is a perspective view of a movable plate and elastic support beams.

Then, the light deflecting element 40 provided to the main scanning deflector 31 will be explained with reference to FIGS. 2A through 2E. FIGS. 2A through 2E are diagrams showing the shape of the light deflecting element. FIG. 2A is a plan view showing the shape of the light deflecting element, FIG. 2B is a side view thereof viewed from the direction indicated by the arrow C in FIG. 2A, FIG. 2C is a cross-sectional view thereof in the cross-sectional surface indicated by the line A-A in FIG. 2A, FIG. 2D is a cross-sectional view thereof in the cross-sectional surface indicated by the line B-B in FIG. 2A, and FIG. 2E is a perspective view of a movable plate and elastic support beams.

As shown in FIGS. 2A through 2E, the light deflecting element 40 is provided with a movable plate 41, a reflecting mirror (a light reflecting section) 42, a pair of elastic support beams (coupling section) 43, 43, and a support frame (a support section) 44. The movable plate 41, the elastic support beams 43, and the support frame 44 are formed by etching, for example, a silicon substrate, in an integrated manner.

The movable plate 41 can rotate around the rotational axis X while the pair of elastic support beams 43, 43 are torsionally deformed.

The movable plate 41 has a circular plate-like shape. The reflecting mirror 42 is disposed on a movable plate adverse surface 41A of the movable plate 41 having a plate-like shape. The reflecting mirror 42 is, for example, an aluminum thin film, and is formed on the movable plate adverse surface 41A, which is a silicon surface finished to be a flat and smooth surface, using a sputtering process, for example.

The movable plate reverse surface 41B, which is a surface on the opposite side to the movable plate adverse surface 41A in the movable plate 41, is provided with a reverse surface recessed section 41C. In the state in which the light deflecting element 40 is incorporated in the main scanning deflector 31, a magnet 37 (see FIGS. 4A and 4B) of a drive device 36 (see FIGS. 4A and 4B) is fixed to the reverse surface recessed section 41C as described later. The reverse surface recessed section 41C corresponds to a recessed section provided to the drive source disposition section and the movable plate reverse surface.

As described above, the movable plate 41 has the reverse surface recessed section 41C (the recessed section) provided to the movable plate reverse surface 41B opposite to the reflecting mirror 42 (the light reflecting section), and at least a part of the magnet 37 is disposed inside the reverse surface recessed section 41C.

The side surface of the movable plate 41 having the circular plate-like shape is provided with a V-groove 41D extending in a circumferential direction formed throughout the entire circumference. The V-groove 41D corresponds to a recessed section extending in substantially parallel to the movable plate adverse surface and the movable plate reverse surface. As shown in FIG. 2D, such a movable plate 41 has a portion having a width gradually decreasing in a direction from the side of the reflecting mirror 42 (the light reflecting section) toward the side of the magnet 37 in a cross-sectional view perpendicular to the rotational axis X (the rotational center axis) thereof.

The pair of elastic support beams 43, 43 have respective one ends connected to the side surface of the movable plate 41 at positions substantially symmetrical about the center of the circular plate-like shape, and extend to the position and in the direction with which the respective center lines are in line with each other along the axial direction of the rotational axis X. Thus, the pair of elastic support beams 43, 43 couple the movable plate 41 rotatably to the support frame 44.

The elastic support beams 43 each have a sub-support beam 43a and a sub-support beam 43b (a plurality of beams). The sub-support beam 43a and the sub-support beam 43b each have a substantially parallelogram cross-sectional shape. The four surfaces of the sub-support beam 43a having a substantially parallelogram cross-sectional shape are described as a sub-beam adverse surface 431a, a sub-beam reverse surface 432a, a sub-beam side surface 433a, and a sub-beam side surface 434a, and the four surfaces of the sub-support beam 43b are described as a sub-beam adverse surface 431b, a sub-beam reverse surface 432b, a sub-beam side surface 433b, and a sub-beam side surface 434b.

The sub-beam adverse surface 431a of the sub-support beam 43a and the movable plate adverse surface 41A are in the same surface of the silicon substrate for forming the light deflecting element 40 by etching, and the sub-beam adverse surface 431a and the movable plate adverse surface 41A are in substantially the same plane. Further, the sub-beam reverse surface 432a of the sub-support beam 43a and the movable plate reverse surface 41B are in the same surface of the silicon substrate, and the sub-beam reverse surface 432a and the movable plate reverse surface 41B are in substantially the same plane. As described above, the elastic support beams 43 (the coupling section) each have the surfaces (e.g., the sub-beam adverse surface 431a and the sub-beam reverse surface 432a) formed continuously so as to be in the same planes with the both surfaces of the movable plate 41, respectively.

The sub-beam side surface 433a has contact with the sub-beam adverse surface 431a at an adverse ridge line 436a, and with the sub-beam reverse surface 432a at a reverse ridge line 439a, and the sub-beam side surface 434a has contact with the sub-beam adverse surface 431a at an adverse ridge line 437a, and with the sub-beam reverse surface 432a at a reverse ridge line 438a.

The adverse ridge line 436a, the reverse ridge line 439a, the adverse ridge line 437a, and the reverse ridge line 438a are substantially parallel to the axial direction of the rotational axis X. In a direction parallel to the reflecting surface of the reflecting mirror 42, the reverse ridge line 439a is located at a position further from the rotational axis X than that of the adverse ridge line 436a, and the reverse ridge line 438a is located at a position further from the rotational axis X than that of the adverse ridge line 437a.

The sub-beam adverse surface 431b of the sub-support beam 43b and the movable plate adverse surface 41A are in the same surface of the silicon substrate for forming the light deflecting element 40 by etching, and the sub-beam adverse surface 431b and the movable plate adverse surface 41A are in substantially the same plane. Further, the sub-beam reverse surface 432b of the sub-support beam 43b and the movable plate reverse surface 41B are in the same surface of the silicon substrate, and the sub-beam reverse surface 432b and the movable plate reverse surface 41B are in substantially the same plane. As described above, the elastic support beams 43 (the coupling section) each have the surfaces (e.g., the sub-beam adverse surface 431b and the sub-beam reverse surface 432b) formed continuously so as to be in the same planes with the both surfaces of the movable plate 41, respectively.

The sub-beam adverse surface 431b, the sub-beam reverse surface 432b, the sub-beam side surface 433b, and the sub-beam side surface 434b of the sub-support beam 43b are located at positions symmetrical to those of the sub-beam adverse surface 431a, the sub-beam reverse surface 432a, the sub-beam side surface 433a, and the sub-beam side surface 434a of the sub-support beam 43a, respectively, with respect to a rotational axial plane perpendicular to the reflecting surface of the reflecting mirror 42 and including the rotational axis X. Adverse ridge line 436b, reverse ridge line 439b, adverse ridge line 437b, and reverse ridge line 438b at which the sub-beam adverse surface 431b, the sub-beam reverse surface 432b, the sub-beam side surface 433b, and the sub-beam side surface 434b have contact with each other are located at positions symmetrical to those of the adverse ridge line 436a, the reverse ridge line 439a, the adverse ridge line 437a, and the reverse ridge line 438a of the sub-support beam 43a with respect to the rotational axial plane.

The adverse ridge line 436b, the reverse ridge line 439b, the adverse ridge line 437b, and the reverse ridge line 438b are substantially parallel to the axial direction of the rotational axis X. In a direction parallel to the reflecting surface of the reflecting mirror 42, the reverse ridge line 439b is located at a position further from the rotational axis X than that of the adverse ridge line 436b, and the reverse ridge line 438b is located at a position further from the rotational axis X than that of the adverse ridge line 437b.

The sub-support beam 43a and the sub-support beam 43b correspond to the first sub-support beam and the second sub-support beam, respectively. The sub-beam side surface 433a and the sub-beam side surface 433b correspond to the first beam side surface, and the sub-beam side surface 434a and the sub-beam side surface 434b correspond to the second beam side surface.

Such sub-support beam 43a and sub-support beam 43b (the first beam and the second beam) are disposed so as to be opposed to each other via the rotational axis X (the rotational center axis) of the movable plate 41 and parallel to each other.

Further, the sub-support beam 43a and the sub-support beam 43b each have a tilted shape in the cross-sectional view perpendicular to the rotational axis X (the rotational center axis) of the movable plate 41 so that the distance from each other increases in a direction from the side of the reflecting mirror 42 (the light reflecting section) toward the side of the magnet 37.

As shown in FIG. 2C, in the cross-sectional view perpendicular to the rotational axis X of the movable plate 41, such elastic support beams 43 each have the sub-support beam 43a and the sub-support beam 43b arranged in a direction parallel to the reflecting mirror 42 to have a shape in which the total value of the width of the sub-support beam 43a, the width of the sub-support beam 43b, and the distance between the sub-support beams 43a, 43b adjacent to each other, all in the direction parallel to the reflecting mirror 42, gradually increases in the direction from the side of the reflecting mirror 42 toward the side of the magnet 37.

In such a manner as described above, the elastic support beams 43 (the coupling section) each have a shape having a width gradually increasing in the direction from the side of the reflecting mirror 42 (the light reflecting section) toward the side of the magnet 37 in the cross-sectional view perpendicular to the rotational axis X (the rotational center axis) of the movable plate 41.

The support frame 44 has a frame-like shape with a support frame opening 45 formed inside a substantially rectangular plate. The movable plate 41 (the reflecting mirror 42) and the pair of elastic support beams 43, 43 (the pair of sets of the sub-support beam 43a and the sub-support beam 43b) are disposed in the support frame opening 45. The sub-support beam 43a and the sub-support beam 43b have the other ends on the opposite side to the one ends thereof, the other ends being connected to the two opposed sides of the frame-like shape of the support frame 44 at substantial centers thereof, respectively.

The light deflecting element 40 is formed by integrally forming the movable plate 41, the elastic support beams 43 (the sub-support beams 43a and the sub-support beams 43b), and the support frame 44 by performing etching on, for example, a silicon substrate, and then forming the reflecting mirror 42 by forming an aluminum thin film on the movable plate adverse surface 41A using, for example, a sputtering process. The sub-beam adverse surface 431a, the sub-beam adverse surface 431b, the movable plate adverse surface 41A, the sub-beam reverse surface 432a, the sub-beam reverse surface 432b, the movable plate reverse surface 41B, and the both surfaces of the support frame 44 are formed of the (100) plane of single crystal silicon. The sub-beam side surface 433a, the sub-beam side surface 434a, the sub-beam side surface 433b, the sub-beam side surface 434b, and a groove surface constituting the V-groove 41D are formed of the (111) plane of single crystal silicon.

As described above, the both plate surfaces of the movable plate 41 are each formed of the (100) plane of single crystal silicon, while the elastic support beams 43 are formed of the (100) plane and the (111) plane of single crystal silicon. Each of the surfaces of the light deflecting element 40 is formed efficiently with accuracy using the fact that single crystal silicon is apt to be etched along the (100) plane and the (111) plane, and thus, the light deflecting element 40 can be formed efficiently with accuracy.

Further, if the movable plate 41 and the elastic support beams 43 are made of singe crystal silicon, the movable plate 41 and the elastic support beams 43 can formed integrally at substantially the same time by performing etching on the single crystal silicon substrate. Further, by forming the movable plate 41 and the elastic support beams 43 integrally, an assemble process can be eliminated to thereby prevent strength degradation in a junction from occurring.

The movable plate 41 (the reflecting mirror 42) rotates around the rotational axis X in accordance with the pair of elastic support beams 43, 43 (the pair of sets of the sub-support beams 43a, 43b) twisting around the rotational axis X. In the state in which the main scanning deflector 31 is incorporated in the projection image display device 1, the rotational axis X shown in FIG. 2A is identical to the rotational axis X shown in FIG. 1. The reflecting mirror 42 corresponds to the reflecting section (the light reflecting section having light reflectivity).

Device Housing

Figure 3A:
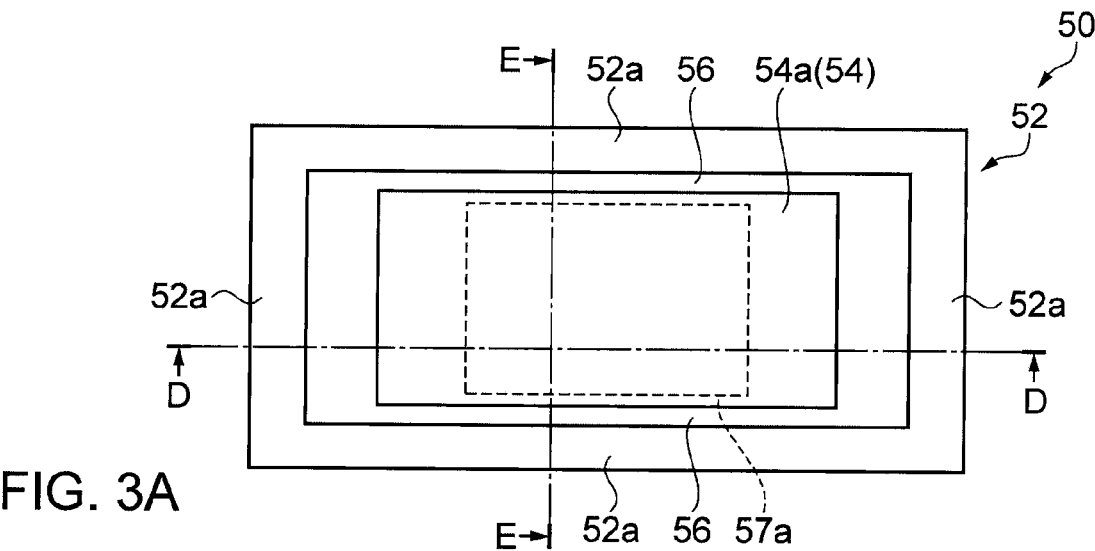
FIG. 3A is a plan view showing an outer shape of a housing main body of a device housing.
Figure 3B:
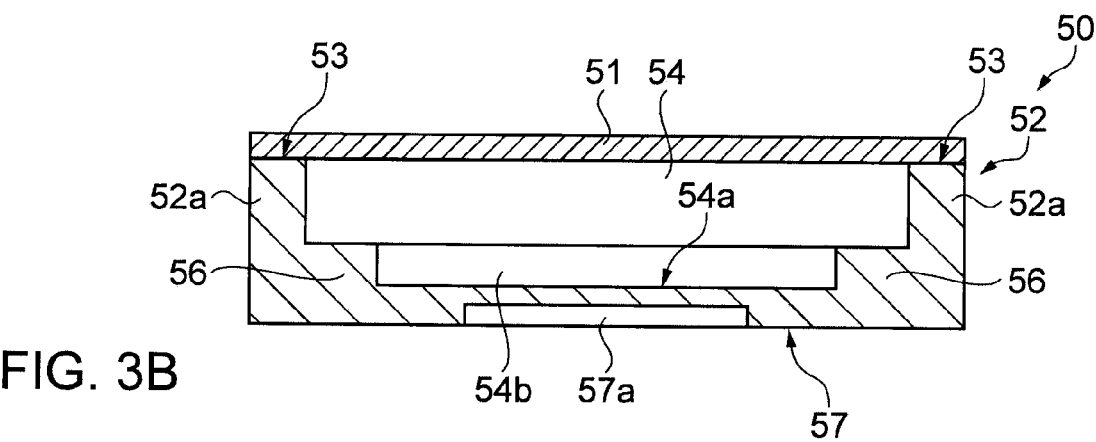
FIG. 3B is a cross-sectional view showing a cross-sectional shape of the housing main body and a sealing lid of the device housing in the cross-sectional surface indicated by the line D-D in FIG. 3A.
Figure 3C:
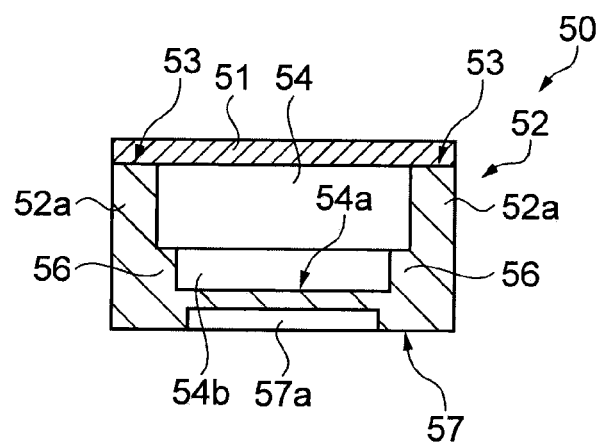
FIG. 3C is a cross-sectional view showing a cross-sectional shape of the housing main body and a sealing lid of the device housing in the cross-sectional surface indicated by the line E-E in FIG. 3A.

Then, the device housing 50 provided to the main scanning deflector 31 will be explained with reference to FIGS. 3A through 3C. FIGS. 3A through 3C are diagrams showing the outer shape of the housing main body and the sealing lid of the device housing. FIG. 3A is a plan view showing an outer shape of the housing main body of the device housing, FIG. 3B is a cross-sectional view showing a cross-sectional shape of the housing main body and the sealing lid of the device housing in the cross-sectional surface indicated by the line D-D in FIG. 3A, and FIG. 3C is a cross-sectional view showing a cross-sectional shape of the housing main body and the sealing lid of the device housing in the cross-sectional surface indicated by the line E-E in FIG. 3A.

As shown in FIGS. 3A through 3C, the device housing 50 is provided with the housing main body 52 and the sealing lid 51. The housing main body 52 has a substantially cuboid shape, and is provided with a device chamber 54 having an opening toward an outer surface in the upper surface 53. One of the outer surfaces of the housing main body 52 opposite to the upper surface 53 is described as an outer bottom surface 57. In the main scanning deflector 31 of the present embodiment, the side of the upper surface 53 is described as an upper side, while the side of the outer bottom surface 57 is described as a lower side. The outer bottom surface 57 is provided with an outer bottom surface recessed section 57a for disposing a drive coil 38 (see FIGS. 4A through 4C) of the drive device 36 (see FIGS. 4A through 4C).

The portion of the housing main body 52 surrounding the device chamber 54 is described as a sidewall 52a. At the corner in the device chamber 54 between the bottom surface 54a and the sidewall 52a, there is formed a support section 56 protruding toward the device chamber 54. The portion of the device chamber 54 surrounded by the bottom surface 54a and the support section 56 is described as a device chamber recessed section 54b. The device chamber recessed section 54b is a space having a substantially cuboid shape. The planar shape of the device chamber 54 is similar to the outer shape of the support frame 44, and is slightly larger than the outer shape of the support frame 44, and therefore, the light deflecting element 40 can be disposed inside the device chamber 54. The light deflecting element 40 disposed inside the device chamber 54 is supported in the support frame 44 having contact with the support section 56 (see FIGS. 4A through 4D). The planar shape of the device chamber recessed section 54b is substantially similar to the planar shape of the support frame opening 45 of the light deflecting element 40, and the support section 56 supports the support frame 44 without having contact with the movable plate 41 and the elastic support beams 43.

The sealing lid 51 is mounted on the upper surface 53, and then the sealing lid 51 and the upper surface 53 are bonded to each other, thereby sealing the device chamber 54. The light beam entering the reflecting mirror 42 enters through the sealing lid 51, and the light beam reflected by the reflecting mirror 42 is transmitted through the sealing lid 51, and is then emitted from the main scanning deflector 31.

The housing main body 52 is formed of, for example, low-temperature fired ceramics. The process of forming a film of a ceramics material and then sintering the film is repeatedly performed to form a multilayer structure, thereby forming the housing main body 52.

Main Scanning Deflector

Figure 4A:
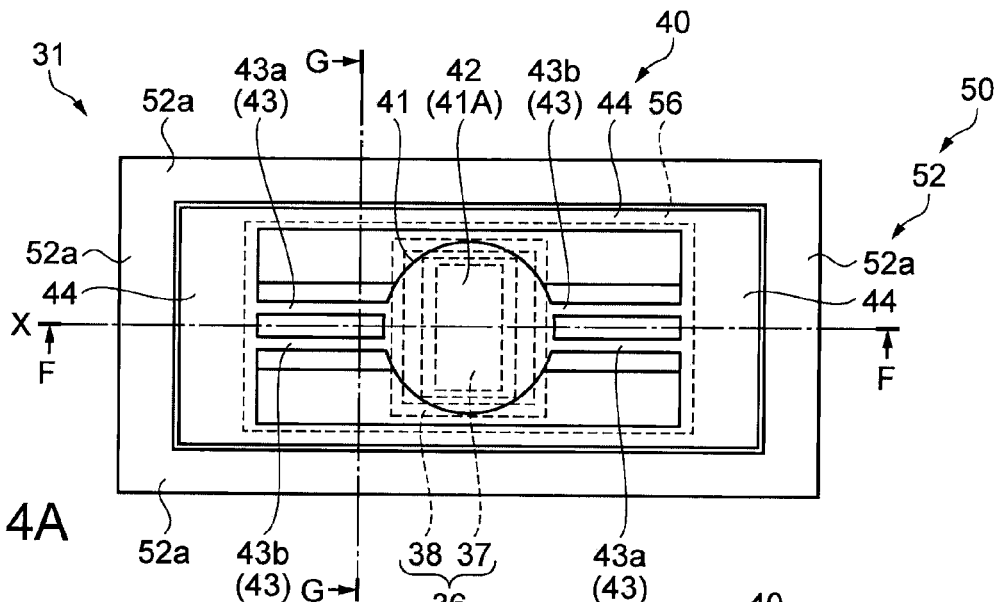
FIG. 4A is a plan view of a main scanning deflector viewed from the side of the sealing lid.
Figure 4B:
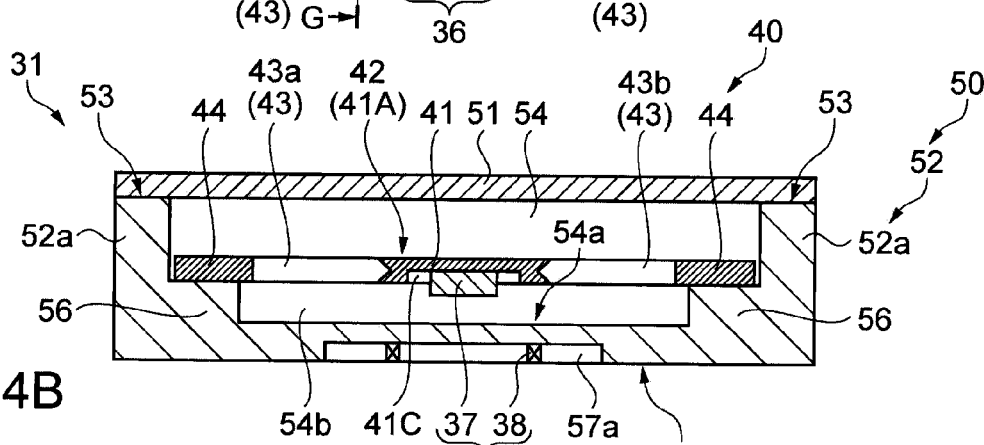
FIG. 4B is a cross-sectional view of the main scanning deflector in the cross-sectional surface indicated by the line F-F in FIG. 4A.
Figures 4C, 4D:
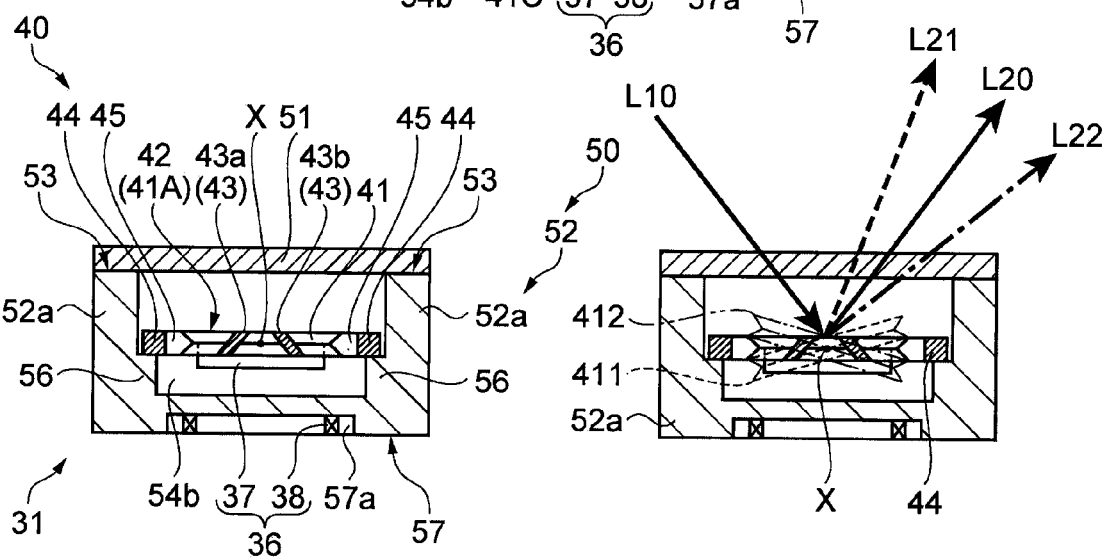
FIG. 4C is a cross-sectional view of the main scanning deflector in the cross-sectional surface indicated by the line G-G in FIG. 4A.
FIG. 4D is a cross-sectional view showing the state in which the movable plate rotates in the cross-sectional surface indicated by the line G-G in FIG. 4A.

Then, the main scanning deflector 31 will be explained with reference to FIGS. 4A through 4D. FIGS. 4A through 4D are diagrams showing a configuration of the main scanning deflector. FIG. 4A is a plan view of the main scanning deflector viewed from the side of the sealing lid, FIG. 4B is a cross-sectional view of the main scanning deflector at the cross-sectional surface indicated by the line F-F in FIG. 4A, FIG. 4C is a cross-sectional view of the main scanning deflector at the cross-sectional surface indicated by the line G-G in FIG. 4A, and FIG. 4D is a cross-sectional view showing the state in which the movable plate rotates in the cross-sectional surface indicated by the line G-G in FIG. 4A.

As shown in FIGS. 4A through 4D, the main scanning deflector 31 is provided with the light deflecting element 40, the device housing 50, and the drive device 36.

The light deflecting element 40 is fixed to the housing main body 52 by the support frame 44 being fixed to the support section 56 in the housing main body 52 of the device housing 50. The movable plate 41, the reflecting mirror 42, and the pair of elastic support beams 43, 43 of the light deflecting element 40 are located in the part corresponding to the device chamber recessed section 54b in the housing main body 52, and the movable plate 41 and the reflecting mirror 42 formed integrally with the movable plate 41 are rotatable.

The magnet 37 of the drive device 36 is fixed to the reverse surface recessed section 41C provided to the movable plate reverse surface 41B on the opposite side of the movable plate 41 to the side on which the reflecting mirror 42 is disposed. The drive coil 38 of the drive device 36 is fixed to the outer bottom surface recessed section 57a of the housing main body 52. The drive coil 38 is disposed at a position substantially opposed to the movable plate 41 via the bottom section of the housing main body 52. The drive device 36 corresponds to the drive source, the magnet 37 corresponds to the permanent magnet and the drive source element, and the drive coil 38 corresponds to the drive source element. The reverse surface recessed section 41C corresponds to a recessed section provided to the drive source disposition section and the movable plate reverse surface.

By a current (an alternating current) varying periodically being applied to the drive coil 38, the drive coil 38 generates an upward (toward the movable plate 41) magnetic field and a downward magnetic field alternately. Due to the magnetic field, the force for moving one of a pair of magnetic poles located at both ends (the both ends located at positions further from the rotational axis X in the main scanning deflector 31) of the magnet 37 closer to the drive coil 38 and moving the other thereof further therefrom acts on the magnet 37. The movable plate 41 to which the magnet 37 is fixed is capable of rotating while the pair of elastic support beams 43, 43 are deformed torsionally, and is made to rotate around the rotational axis X as shown in FIG. 4D.

As described above, the light deflecting element 40 is fixed to the housing main body 52 by the support frame 44 being fixed to the support section 56 in the housing main body 52. The sealing lid 51 is fixed to the housing main body 52 by bonding the connection surface on the reverse side of the lid and the upper surface 53 of the housing main body 52 to each other, and the device chamber 54 is sealed by the sealing lid 51.

As the method for the bonding of the sealing lid 51 to the housing main body 52, a method suitable for the constituent materials of the sealing lid 51 and the housing main body 52 is selected, and the bonding is performed using the bonding method such as metal bonding, eutectic bonding, or anodic bonding.

Most part of the light beam L10 emitted toward the reflecting mirror 42 is transmitted through the sealing lid 51, and then enters the reflecting mirror 42. Although the light beam is slightly reflected to cause a reflected light beam when the light beam enters the sealing lid 51 or is emitted from the sealing lid 51, the reflected light beam will be omitted from the explanation of the present embodiment. Further, although due to the difference in refractive index between the air, the sealing lid 51, and the device chamber 54 in a negative pressure condition, refraction is caused at each of the boundaries therebetween, the refraction will be omitted from the explanation of the present embodiment.

As shown in FIG. 4D, the light beam L10 travels straight to enter the reflecting mirror 42. The light beam L10 having entered the reflecting mirror 42 is then reflected by the reflecting mirror 42, and is emitted as a light beam L20.

The movable plate 41 is made to rotate to thereby reciprocate in a range between the movable plate 411 and the movable plate 412. The light beam thus reflected is scanned in a range between the light beam L21 and the light beam L22.

The movable plate 41 is made to rotate to thereby twist the pair of elastic support beams 43, 43. When the elastic support beams 43 are twisted, large stress is caused in the sub-beam side surfaces 433a, 434a and the sub-beam side surfaces 433b, 434b in the sub-support beams 43a, 43b constituting each of the elastic support beams 43. In the connecting section between the sub-support beams 43a, 43b and the movable plate 41, the largest stress is caused in the inside of the sub-support beams 43a, 43b on the side where the distance between the sub-support beams 43a, 43b is larger. In other words, the stress around the reverse ridge line 439a in the sub-support beam 43a and the reverse ridge line 439b in the sub-support beam 43b becomes large.

In the movable plate 41, the stress around the connecting section with the reverse ridge line 439a and the reverse ridge line 439b becomes large in the connecting section of the movable plate 41 with each of the sub-support beams 43a, 43b, and the deflection also becomes large in proportion thereto.

In the light deflecting element 40, the magnet 37 is fixed to the movable plate 41 at a position close to the connecting section with the reverse ridge lines 439a, 439b. The magnet 37 is made of, for example, iron-based metal, and has higher rigidity compared to the silicon material constituting the movable plate 41. Therefore, the deflection of the movable plate 41 due to the stress caused by twisting the sub-support beams 43a, 43b can be reduced in the portion with the maximum deflection.

Other Examples of Light Deflecting Element

Figure 5A:
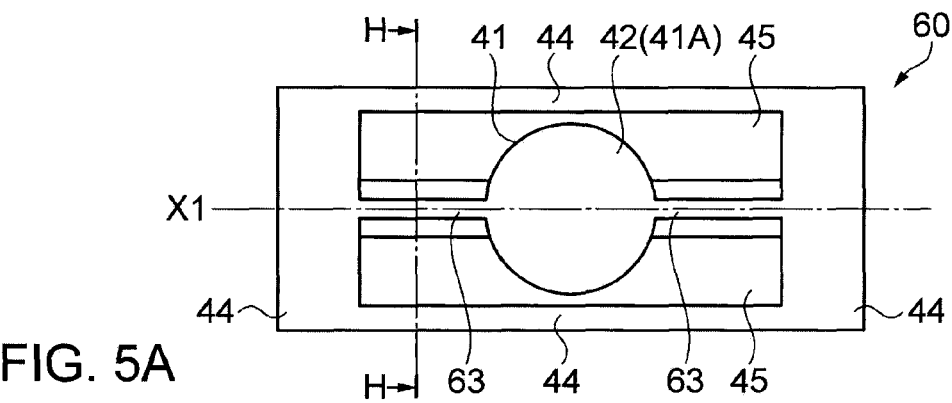
FIG. 5A is a plan view showing a shape of a light deflecting element.
Figure 5B:
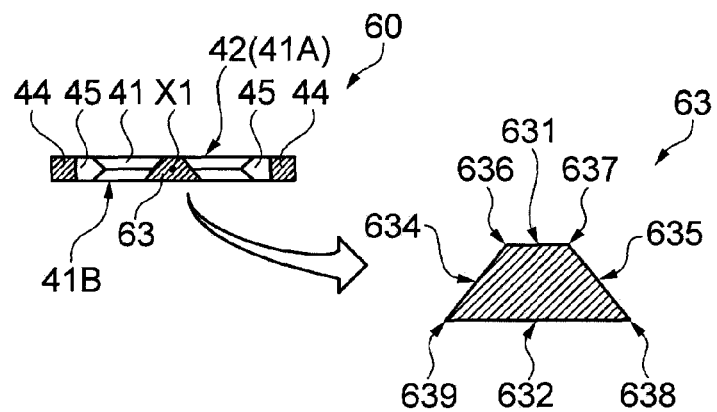
FIG. 5B is a cross-sectional view thereof in the cross-sectional surface indicated by the line H-H in FIG. 5A.
Figure 5C:
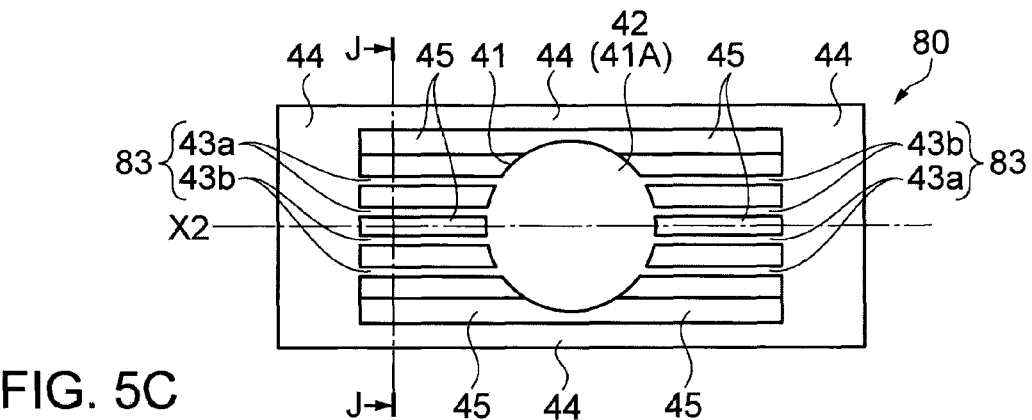
FIG. 5C is a plan view showing a shape of a light deflecting element.
Figure 5D:
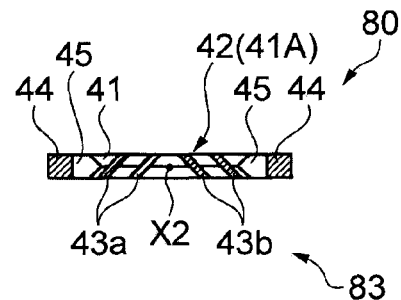
FIG. 5D is a cross-sectional view thereof in the cross-sectional surface indicated by the line J-J in FIG. 5C.

Then, a light deflecting element 60 and a light deflecting element 80 partially different in configuration from the light deflecting element 40 will be explained with reference to FIGS. 5A through 5D. FIGS. 5A through 5D are diagrams showing the shapes of the light deflecting elements. FIG. 5A is a plan view showing the shape of the light deflection element, and FIG. 5B is a cross-sectional view thereof at the cross-sectional surface indicated by the line H-H in FIG. 5A. FIG. 5C is a plan view showing the shape of the light deflection element, and FIG. 5D is a cross-sectional view thereof at the cross-sectional surface indicated by the line J-J in FIG. 5C.

As shown in FIGS. 5A and 5B, the light deflecting element 60 is provided with the movable plate 41, the reflecting mirror 42, a pair of elastic support beams 63, 63, and the support frame 44. The movable plate 41, the reflecting mirror 42, the support frame 44 are substantially the same as the movable plate 41, the reflecting mirror 42, the support frame 44 in the light deflecting element 40. The light deflecting element 60 is different from the light deflecting element 40 in that the elastic support beams 63 are different from the pair of elastic support beams 43, 43 in the light deflecting element 40.

The movable plate 41, the elastic support beams 63, and the support frame 44 are formed by etching, for example, a silicon substrate, in an integrated manner. The movable plate 41 can rotate around the rotational axis X1 while the elastic support beams 63 are torsionally deformed.

Similarly to the elastic support beams 43 in the light deflecting element 40, the pair of elastic support beams 63, 63 have respective one ends connected to the side surface of the movable plate 41 at positions substantially symmetrical about the center of the circular plate-like shape, and extend to the position and in the direction with which the respective center lines are in line with each other along the axial direction of the rotational axis X1.

The elastic support beams 63 each have a trapezoidal cross-sectional shape in the cross-sectional surface perpendicular to the rotational axis X1. The four surfaces forming the trapezoidal cross-sectional shape are described as a beam adverse surface 631, a beam reverse surface 632, a beam side surface 634, and a beam side surface 635.

The beam adverse surface 631, the beam reverse surface 632, the movable plate adverse surface 41A, the movable plate reverse surface 41B, and the both surfaces of the support frame 44 are formed of the (100) plane of single crystal silicon. The beam side surface 634, the beam side surface 635, and the groove surface forming the V-groove 41D are formed of the (111) plane of single crystal silicon.

The beam adverse surface 631 of the elastic support beam 63, the movable plate adverse surface 41A are in the same surface of the silicon substrate for forming the light deflecting element 60 by etching, and the beam adverse surface 631 and the movable plate adverse surface 41A are in substantially the same plane. Further, the beam reverse surface 632 of the elastic support beam 63 and the movable plate reverse surface 41B are in the same surface of the silicon substrate, and the beam reverse surface 632 and the movable plate reverse surface 41B are in substantially the same plane. The beam side surface 634 has both sides respectively having contact with the beam adverse surface 631 at an adverse ridge line 636, and the beam reverse surface 632 at a reverse ridge line 639, and the beam side surface 635 has both sides respectively having contact with the beam adverse surface 631 at an adverse ridge line 637, and the beam reverse surface 632 at a reverse ridge line 638.

The adverse ridge line 636, the reverse ridge line 639, the adverse ridge line 637, and the reverse ridge line 638 are substantially parallel to the axial direction of the rotational axis X1. The width of the beam reverse surface 632 is larger than the width of the beam adverse surface 631 in the direction perpendicular to the rotational axis X1. The reverse ridge line 639 is located at a position further from the rotational axis X1 than the adverse ridge line 636, and the reverse ridge line 638 is located at a position further from the rotational axis X1 than the adverse ridge line 637.

When the pair of elastic support beams 63, 63 are twisted around the rotational axis X1, the movable plate 41 (the reflecting mirror 42) rotates around the rotational axis X1. In the state in which the main scanning deflector equipped with the light deflecting element 60 is incorporated in the projection image display device 1, the rotational axis X1 shown in FIG. 5A is identical to the rotational axis X shown in FIG. 1. The main scanning deflector equipped with the light deflecting element 60 operates in substantially the same manner as that of the main scanning deflector 31 equipped with the light deflecting element 40.

When the main scanning deflector equipped with the light deflecting element 60 operates, the movable plate 41 is made to rotate, and the pair of elastic support beams 63, 63 are twisted. When the elastic support beams 63 are twisted, the largest stress is caused in the portion around the reverse ridge line 638 and the reverse ridge line 639, which are located further from a neutral axis.

In the movable plate 41 of the light deflecting element 60, the stress around the connecting section with the reverse ridge line 638 and the reverse ridge line 639 becomes large in the connecting section of the movable plate 41 with each of the elastic support beams 63, and the deflection also becomes large in proportion thereto.

In the light deflecting element 60, similarly to the case of the light deflecting element 40, the magnet 37 is fixed to the movable plate 41 at a position close to the connecting section with the reverse ridge lines 638, 639. The magnet 37 is made of, for example, iron-based metal, and has higher rigidity compared to the silicon material constituting the movable plate 41. Therefore, the deflection of the movable plate 41 due to the stress caused by twisting the elastic support beams 63 can be reduced in the portion with the maximum deflection.

As shown in FIGS. 5C and 5D, the light deflecting element 80 is provided with the movable plate 41, the reflecting mirror 42, a pair of elastic support beams 83, 83, and the support frame 44. The movable plate 41, the reflecting mirror 42, the support frame 44 are substantially the same as the movable plate 41, the reflecting mirror 42, the support frame 44 in the light deflecting element 40. The light deflecting element 80 is different from the light deflecting element 40 in that the elastic support beam 83 of the pair of elastic support beams 83, 83 is different from the elastic support beam 43 in the light deflecting element 40.

The movable plate 41, the elastic support beams 83, and the support frame 44 are formed by etching, for example, a silicon substrate, in an integrated manner. The movable plate 41 can rotate around the rotational axis X2 while the elastic support beams 83 are torsionally deformed.

The pair of elastic support beams 83, 83 have respective one ends connected to the side surface of the movable plate 41 at positions substantially symmetrical about the center of the circular plate-like shape, and extend to the position and in the direction with which the respective center lines are in line with each other along the axial direction of the rotational axis X2.

The elastic support beams 83 each have two sub-support beams 43a and two sub-support beams 43b. The sub-support beam 43a and the sub-support beam 43b are equivalent to the sub-support beam 43a and the sub-support beam 43b constituting the elastic support beams 43 of the light deflecting element 40, respectively. In the elastic support beams 83, the two sub-support beams 43a extend parallel to the axial direction of the rotational axis X2, and are disposed side-by-side on the same side with respect to the rotational axis X2. The two sub-support beams 43b are disposed at positions symmetrical to those of the two sub-support beams 43a with respect to the plane perpendicular to the surface of the reflecting mirror 42 and including the rotational axis X2.

Similarly to the sub-support beam 43a and the sub-support beam 43b in the elastic support beams 43, in the sub-support beam 43a and the sub-support beam 43b in the elastic support beams 83, the adverse ridge line 436a, the reverse ridge line 439a, the adverse ridge line 437a, and the reverse ridge line 438a are all substantially parallel to the axial direction of the rotational axis X2. Regarding the sub-support beam 43a and the sub-support beam 43b located further from the rotational axis X2, the reverse ridge line 439a is located at a position further from the rotational axis X2 than the adverse ridge line 436a, and the reverse ridge line 438a is located at a position further from the rotational axis X2 than the adverse ridge line 437a.

The movable plate 41 (the reflecting mirror 42) rotates around the rotational axis X2 in accordance with the pair of elastic support beams 83, 83 (the pair of sets of the two sub-support beams 43a and the two sub-support beams 43b) twisting around the rotational axis X2. In the state in which the main scanning deflector equipped with the light deflecting element 80 is incorporated in the projection image display device 1, the rotational axis X2 shown in FIG. 5C is identical to the rotational axis X shown in FIG. 1. The main scanning deflector equipped with the light deflecting element 80 operates in substantially the same manner as that of the main scanning deflector 31 equipped with the light deflecting element 40.

When the main scanning deflector equipped with the light deflecting element 80 operates, the movable plate 41 is made to rotate, and the pair of elastic support beams 83, 83 are twisted. When the elastic support beams 83 are twisted, substantially the same stress as in the sub-support beam 43a and the sub-support beam 43b in the elastic support beams 43 is caused in the sub-support beams 43a, 43b constituting each of the elastic support beams 83. Therefore, the stress around the reverse ridge line 439a in the sub-support beam 43a located further from the rotational axis X2 and the reverse ridge line 439b in the sub-support beam 43b located further from the rotational axis X2 becomes large.

In the movable plate 41, the stress around the connecting section with the reverse ridge line 439a and the reverse ridge line 439b becomes large in the connecting section of the movable plate 41 with the sub-support beams 43a, 43b, and the deflection also becomes large in proportion thereto.

In the light deflecting element 80, similarly to the case of the light deflecting element 40, the magnet 37 is fixed to the movable plate 41 at a position close to the connecting section with the reverse ridge lines 439a, 439b. The magnet 37 is made of, for example, iron-based metal, and has higher rigidity compared to the silicon material constituting the movable plate 41. Therefore, the deflection of the movable plate 41 due to the stress caused by twisting the elastic support beams 83 can be reduced in the portion with the maximum deflection.

Printer

Figure 6:
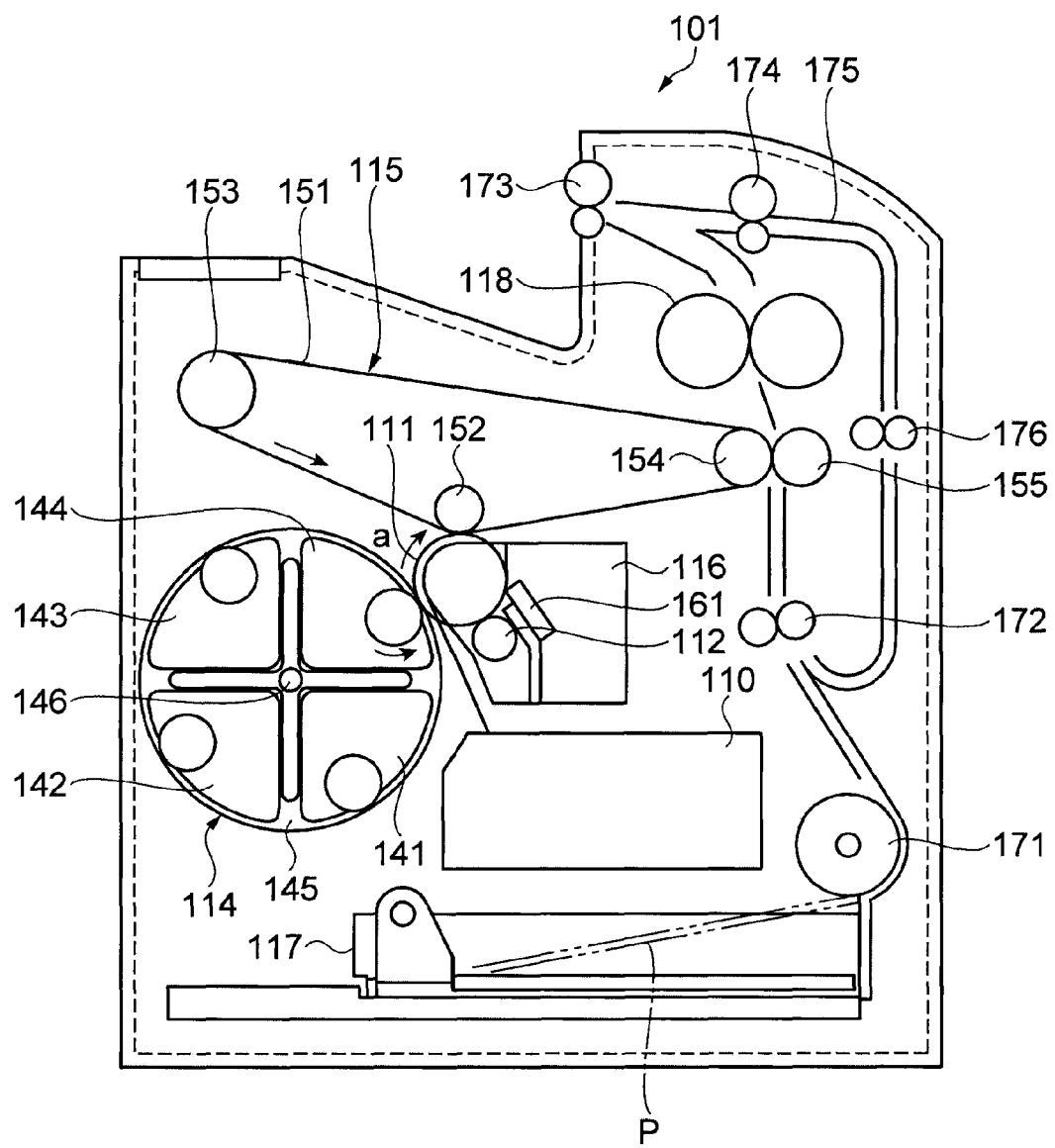
FIG. 6 is a cross-sectional diagram schematically showing an overall configuration of a printer.
Figure 7:
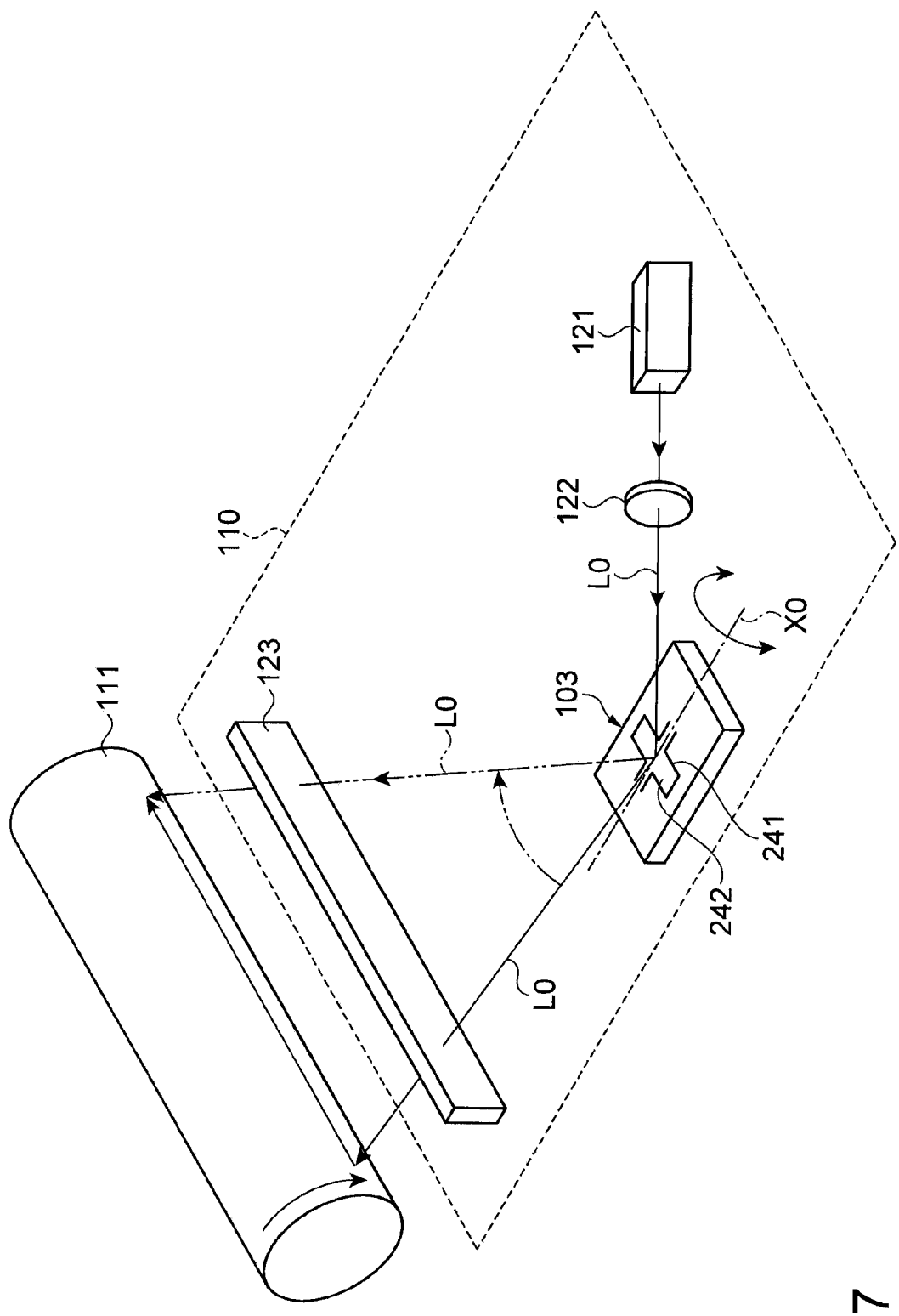
FIG. 7 is an explanatory diagram showing a schematic configuration of an exposure unit provided to the printer.

Then, a printer as the image forming device equipped with the light deflector different from the projection image display device will be explained with reference to FIGS. 6 and 7. The printer 101 explained in the present embodiment is a printer adopting an electrophotographic recording method. FIG. 6 is a cross-sectional diagram schematically showing an overall configuration of a printer. FIG. 7 is an explanatory diagram showing a schematic configuration of an exposure unit provided to the printer.

The printer 101 is for recording an image made of toner on a recording medium such as a paper sheet or an OHP sheet using a series of image forming process including exposure, development, transfer, and fixing.

As shown in FIG. 6, the printer 101 is provided with an image forming unit composed mainly of a photoconductor 111, a charging unit 112, an exposure unit 110, a development unit 114, a transfer unit 115, and a cleaning unit 116. When performing printing, the photoconductor 111 rotates in a direction indicated by the arrow "a" shown in FIG. 6. The charging unit 112, the exposure unit 110, the development unit 114, the transfer unit 115, and the cleaning unit 116 are disposed in the periphery of the photoconductor 111 along the rotational direction of the photoconductor 111 in this order.

The printer 101 is further provided with a paper feed tray 117 for housing the recording medium P such as paper sheets, and a fixing device 118. The paper feed tray 117 is disposed on one side (the lower side of the image forming unit in FIG. 6) of the image forming unit, and the fixing device 118 is disposed on the substantially opposite side (the upper side of the image forming unit in FIG. 6) of the paper feed tray 117 across the image forming unit.

In the image forming unit, the charging unit 112 charges the photoconductor 111, the exposure unit 110 forms a latent image, the development unit 114 develops the latent image with the toner, and the image thus developed is transferred to the transfer unit 115.

More specifically, firstly, in response to an instruction from a host computer not shown, the photoconductor 111, the development roller (not shown) provided to the development unit 114, and an intermediate transfer belt 151 of the transfer unit 115 start to rotate. The photoconductor 111 is sequentially charged by the charging unit 112 in the portion opposed to the charging unit 112 while rotating.

The region of the photoconductor 111 thus charged reaches the exposure position as the photoconductor 111 rotates, and the exposure unit 110 forms the latent image corresponding to the image information of the first color, for example, yellow Y in the region.

The latent image formed on the photoconductor 111 reaches the development position opposed to the development unit 114 as the photoconductor 111 rotates, and is developed with the yellow toner by the development device for yellow development, for example, a development device 144. By being developed with the yellow toner, the image with the yellow toner is formed on the photoconductor 111.

The development unit 114 is provided with a holding member 145 rotating around an axis 146, and development devices 141, 142, 143, 144. The development devices 141, 142, 143, 144 are held by the holding member 145, and are able to rotate around the axis 146. The holding member 145 rotates to position either of the development devices 141, 142, 143, 144 corresponding to the color to be developed to the position facing the photoconductor 111. In the case of performing the development with the yellow toner, for example, the development device 144 is positioned there.

The image formed on the photoconductor 111, such as the yellow toner image, reaches the primary transfer position where the photoconductor 111 is opposed to a primary transfer roller 152 of the transfer unit 115 as the photoconductor 111 rotates. In this case, a primary transfer voltage (primary transfer bias) having the polarity reverse to the polarity of the charge of the toner is applied to the primary transfer roller 152. The primary transfer roller 152 to which the primary transfer voltage is applied transfers (performs the primary transfer of) the image formed on the photoconductor 111 such as the yellow toner image to the intermediate transfer belt 151. The intermediate transfer belt 151 rotates while rotating a drive roller 154 to thereby make the primary transfer roller 152 and the driven roller 153 driven-rotate. It should be noted that, meanwhile a secondary transfer roller 155 is separated from the intermediate transfer belt 151.

The process substantially the same as the formation of the latent image, the development, and the primary transfer is performed on the other colors (the second color, the third color, and the fourth color, in the present embodiment) in a repeated manner, thereby transferring the toner images of the respective colors corresponding to the respective image signals on the intermediate transfer belt 151 in an overlapping manner. Thus, the full-color toner image is formed on the intermediate transfer belt 151.

The recording medium P is conveyed by a paper feed roller 171 and a registration roller 172 from the paper feed tray 117 to the secondary transfer position where the secondary transfer roller 155 and the drive roller 154 are opposed to each other across the intermediate transfer belt 151.

The full-color toner image formed on the intermediate transfer belt 151 reaches the secondary transfer position as the intermediate transfer belt 151 rotates. On this occasion, the secondary transfer roller 155 is pressed against the intermediate transfer belt 151, and at the same time a secondary transfer voltage (secondary transfer bias) is applied thereto. The recording medium P and the portion of the intermediate transfer belt on which the full-color toner image is formed having reached the secondary transfer position are pinched by the secondary transfer roller 155 and the drive roller 154 to be pressed against each other, and the full-color toner image is transferred (secondary-transferred) to the recording medium P by the secondary transfer roller 155 to which the secondary transfer voltage is applied.

The full-color toner image transferred to the recording medium P is heated and pressurized by the fixing device 118 to thereby be fused to the recording medium P. Subsequently, in the case of single-side print, the recording medium P is discharged to the outside of the exposure unit 110 by the discharge roller pair 173.

Meanwhile, after the photoconductor 111 passes through the primary transfer position, the toner attached to the surface of the photoconductor 111 is scratched out by the cleaning blade 161 of the cleaning unit 116 to prepare for the charge for forming the subsequent latent image. The toner thus scratched out is collected by the residual toner collecting section in the cleaning unit 116.

In the case of the both side printing, after once nipping the recording medium P, on one side of which the fixing process is executed by the fixing unit 118, by the discharge roller pair 173, the recording medium P is returned to the secondary transfer position while reversing the recording medium P through the conveying path 175 by reversely driving the discharge roller pair 173 and at the same time driving the conveying rollers 174, 176, and then an image is formed on the other side of the recording medium P through substantially the same operation as described above.

The exposure unit 110 provided to the printer 101 is a device for receiving image information and an image formation command from the host computer such as a personal computer not shown, and selectively applying the laser beam to the surface of the photoconductor 111 charged with uniformity to thereby form the electrostatic latent image corresponding to the image information.

As shown in FIG. 7, the exposure unit 110 is provided with an actuator 103 corresponding to the light deflector, a laser source 121, a collimator lens 122, and an fθ lens 123. The actuator 103 has a movable plate 241 rotatable around a rotational axis X0, and a reflecting mirror 242 formed on the movable plate 241.

In the exposure unit 110, the laser beam L0 is applied to the reflecting mirror 242 of the actuator 103 from the laser source 121 via the collimator lens 122. The laser beam L0 applied thereto is reflected by the reflecting mirror 242, and is then applied to the surface of the photoconductor 111 via the fθ lens 123.

On this occasion, by the actuator 103 being driven and the movable plate 241 rotating around the rotational axis X0, the laser beam L0 reflected by the reflecting mirror 242 formed on the movable plate 241 is scanned (to perform the main scanning) in the axial direction of the photoconductor 111. At the same time, by the photoconductor 111 rotating, the laser beam L0 reflected by the reflecting mirror 242 is scanned (to perform the sub-scanning) in the circumferential direction of the photoconductor 111. By the laser beam being scanned on the photoconductor 111 in the main scanning direction and the sub-scanning direction, an image along the surface is formed on the photoconductor 111. The laser source 121 corresponds to the light source. The actuator 103 corresponds to the light deflector, and the reflecting mirror 242 corresponds to the reflecting section.

The intensity of the laser beam L0 emitted from the laser source 121 varies in accordance with the image information received from the host computer not shown. The density of the toner image in the portion irradiated with the laser beam is determined by the intensity of the laser beam L0 applied to the photoconductor 111, and the color tone and density of that portion are determined in accordance with the combination of the densities of the respective colors in that portion.

In such a manner as described above, the exposure unit 110 selectively exposes the surface of the photoconductor 111 to thereby perform image formation (drawing).

Hereinafter, the advantages of the embodiment will be described. According to the present embodiment, the following advantages can be obtained.

1. In light deflecting element 40, the reverse ridge line 439a is located at a position further from the rotational axis X than that of the adverse ridge line 436a, and the reverse ridge line 438a is located at a position further from the rotational axis X than that of the adverse ridge line 437a in the sub-support beam 43a constituting the elastic support beams 43. In the sub-support beam 43b, the reverse ridge line 439b is located at a position further from the rotational axis X than that of the adverse ridge line 436b, and the reverse ridge line 438b is located at a position further from the rotational axis X than that of the adverse ridge line 437b. Such an elastic support beams 43 (the coupling section) each have a shape having a width gradually increasing in the direction from the side of the reflecting mirror 42 (the light reflecting section) toward the side of the magnet 37 in the cross-sectional view perpendicular to the rotational axis X (the rotational center axis) of the movable plate 41. In this configuration, when the movable plate 41 is made to rotate, and the elastic support beams 43 (the sub-support beam 43a and the sub-support beam 43b) are twisted, the stress around the reverse ridge line 439a in the sub-support beam 43a and the reverse ridge line 439b in the sub-support beam 43b becomes large. In the movable plate 41, the stress around the connecting section with the reverse ridge line 439a and the reverse ridge line 439b becomes large, and the deflection also becomes large in proportion thereto. Since the magnet 37 having higher rigidity compared to silicon is fixed to the movable plate 41 at a position close to the connecting section with the reverse ridge line 439a and the reverse ridge line 439b, the deflection of the movable plate 41 due to the stress caused by twisting the sub-support beams 43a, 43b is reduced in the portion with the maximum deflection. Thus, the amount of deflection of the movable plate 41 can be reduced.

2. In the light deflecting element 60, the elastic support beams 63 each have a trapezoidal cross-sectional shape, and when the elastic support beams 63 are twisted, the largest stress is caused in the portion around the reverse ridge line 638 and the reverse ridge line 639, which are located further from the neutral axis. In the movable plate 41, the stress around the connecting section with the reverse ridge line 638 and the reverse ridge line 639 becomes large, and the deflection also becomes large in proportion thereto. Since the magnet 37 having higher rigidity compared to silicon is fixed to the movable plate 41 at a position close to the connecting section with the reverse ridge line 638 and the reverse ridge line 639, the deflection of the movable plate 41 due to the stress caused by twisting the elastic support beams 63 is reduced in the portion with the maximum deflection. Thus, the amount of deflection of the movable plate 41 can be reduced.

3. In light deflecting element 80, the reverse ridge line 439a is located at a position further from the rotational axis X2 than that of the adverse ridge line 436a, and the reverse ridge line 438a is located at a position further from the rotational axis X2 than that of the adverse ridge line 437a in the sub-support beam 43a constituting the elastic support beams 83. In the sub-support beam 43b, the reverse ridge line 439b is located at a position further from the rotational axis X2 than that of the adverse ridge line 436b, and the reverse ridge line 438b is located at a position further from the rotational axis X2 than that of the adverse ridge line 437b. In this configuration, when the movable plate 41 is made to rotate, and the elastic support beams 83 (the sub-support beams 43a and the sub-support beams 43b) are twisted, the stress around the reverse ridge line 439a in the sub-support beam 43a located further from the rotational axis and the reverse ridge line 439b in the sub-support beam 43b located further from the rotational axis becomes large. In the movable plate 41, the stress around the connecting section with the reverse ridge line 439a and the reverse ridge line 439b becomes large, and the deflection also becomes large in proportion thereto. Since the magnet 37 having higher rigidity compared to silicon is fixed to the movable plate 41 at a position close to the connecting section with the reverse ridge line 439a and the reverse ridge line 439b, the deflection of the movable plate 41 due to the stress caused by twisting the sub-support beams 43a, 43b are reduced in the portion with the maximum deflection. Thus, the amount of deflection of the movable plate 41 can be reduced.

4. The elastic support beams 43 are each composed of the sub-support beam 43a and the sub-support beam 43b, and the elastic support beams 83 are each composed of the two sub-support beams 43a and the two sub-support beams 43b. By constituting the elastic support beam with a plurality of sub-support beams, the rigidity of the elastic support beam required in the case in which the amount of twist is constant and the maximum stress caused in the elastic support beam is the same can be reduced compared to the case of the lone elastic support beam. In the case of keeping the rigidity, the length of the elastic support beam, another factor determining the rigidity, can be reduced.

5. In the movable plate 41, the side surface of the circular plate-like shape is provided with the V-groove 41D extending in a circumferential direction formed throughout the entire circumference. Such a movable plate 41 has a portion having a width gradually decreasing in a direction from the side of the reflecting mirror 42 (the light reflecting section) toward the side of the magnet 37 in a cross-sectional view perpendicular to the rotational axis X (the rotational center axis) thereof. Thus, it becomes possible to reduce the inertia moment of the movable plate 41 without reducing the area of the reflecting mirror 42.

6. The movable plate reverse surface 41B in the movable plate 41 is provided with the reverse surface recessed section 41C, and the magnet 37 is fixed to the reverse surface recessed section 41C. In other words, the movable plate 41 has the reverse surface recessed section 41C (the recessed section) provided to the movable plate reverse surface 41B opposite to the reflecting mirror 42 (the light reflecting section), and at least apart of the magnet 37 is disposed inside the reverse surface recessed section 41C. By fixing the magnet 37 to the reverse surface recessed section 41C recessed from the movable plate reverse surface 41B, the magnet 37 can be disposed at a position closer to the rotational axis such as the rotational axis X compared to the case of fixing the magnet to the movable plate reverse surface 41B. By disposing the magnet 37 having a specific gravity larger than that of silicon constituting the movable plate 41 at a position close to the rotational axis, the inertia moment of the system composed of the movable plate 41 and the magnet 37 around the rotational axis can be set smaller.

7. The sub-beam adverse surface 431*a* and the movable plate adverse surface 41A are in substantially the same plane, the sub-beam reverse surface 432*a* and the movable plate reverse surface 41B are in substantially the same plane, the sub-beam adverse surface 431*b* and the movable plate adverse surface 41A are in substantially the same plane, and the sub-beam reverse surface 432*b* and the movable plate reverse surface 41B are in substantially the same plane. In other words, the sub-support beam 43*a* and the sub-support beam 43*b* and the movable plate 41 are respectively connected in the conditions in which no step is provided to the connecting section in both of the sides, the side of the movable plate adverse surface 41A and the side of the movable plate reverse surface 41B. As described above, the elastic support beams 43 (the coupling section) each have the surfaces formed continuously so as to be in the same planes with the both surfaces of the movable plate 41, respectively. Thus, it is possible to prevent that the stress is increased due to the occurrence of the stress concentration in the corners of the steps.

Although a preferred embodiment is hereinabove described with reference to the accompanying drawings, the preferred embodiment is not limited to the embodiment described above. The embodiment can obviously be added with various modifications within the scope or the spirit of the invention, and can be put into practice as described below.

MODIFIED EXAMPLE 1

Although in the embodiments described above the elastic support beams 63 each having the trapezoidal cross-sectional surface, the elastic support beams 43 each having the sub-support beam 43*a* and the sub-support beam 43*b* each having the parallelogram cross-sectional surface, and the elastic support beams 83 each having the two sub-support beams 43*a* and the two sub-support beams 43*b* as examples of the elastic support beam, the configuration of the elastic support beam is not limited to these configurations. The configuration provided with a plurality of sub-support beams each having the trapezoidal cross-sectional surface, or the configuration of combining the sub-support beam having the trapezoidal cross-sectional surface and the sub-support beam having the parallelogram cross-sectional surface can also be adopted. Any configuration of the elastic support beam can be adopted providing the elastic support beam has the shape in which the width thereof on the side having higher rigidity in the movable plate, namely the side provided with the drive source element with higher rigidity, for example, is larger.

MODIFIED EXAMPLE 2

Although in the embodiments described above, in the movable plate 41, the side surface of the circular plate-like shape is provided with the V-groove 41D extending in a circumferential direction formed throughout the entire circumference, it is not fundamental to form a recessed section such as a groove in the circumference of the movable plate. The end surface of the movable plate can be flat. Further, it is not fundamental that the recessed section is the groove having the V shape. The groove with any shape can be adopted.

MODIFIED EXAMPLE 3

Although in the embodiments described above the movable plate 41 has the circular plate-like shape, it is not fundamental that the movable plate has a circular shape. The plate-like movable plate can have an oval shape, an ellipsoidal shape, or a polygonal shape.

MODIFIED EXAMPLE 4

Although in the embodiments described above the movable plate reverse surface 41B in the movable plate 41 is provided with the reverse surface recessed section 41C as the drive source disposition section, and the magnet 37 as the drive source element is fixed to the reverse surface recessed section 41C, it is not fundamental that the drive source disposition section is the recessed section provided to the movable plate. The configuration of disposing the drive source element on the flat reverse surface of the movable plate can also be adopted.

MODIFIED EXAMPLE 5

In the embodiments described above, the sub-beam adverse surface 431*a* and the movable plate adverse surface 41A are in substantially the same plane, the sub-beam reverse surface 432*a* and the movable plate reverse surface 41B are in substantially the same plane, the sub-beam adverse surface 431*b* and the movable plate adverse surface 41A are in substantially the same plane, and the sub-beam reverse surface 432*b* and the movable plate reverse surface 41B are in substantially the same plane. However, it is not fundamental that the adverse surface and the reverse surface of the elastic support beam and the adverse surface and the reverse surface of the movable plate are respectively in the same plane. The configuration in which either one of or both of the adverse surface and the reverse surface of the elastic support beam is not in the same plate with the adverse surface and the reverse surface of the movable plate can also be adopted.

MODIFIED EXAMPLE 6

Although in the embodiments described above the sub-scanning deflector 32 is formed of the galvanometer mirror, the light deflector using the light deflecting element such as the main scanning deflector 31 can also be adopted as the light deflector used in such a manner as the sub-scanning deflector 32.

MODIFIED EXAMPLE 7

Although in the embodiments described above, the support frame 44 has the frame-like shape with the support frame opening 45 formed inside the plate having a substantially rectangular shape, it is not fundamental that the support frame such as the support frame 44 has the frame-like shape. Any shape of support frame can be adopted providing the strength sufficient to support the elastic support beam can be achieved.

The entire disclosure of Japanese Patent Application No.: 2009-241123, filed Oct. 20, 2009 and 2010-105742, filed Apr. 30, 2010 are expressly incorporated by reference herein.

What is claimed is:

1. A light deflecting element comprising:
   a movable plate provided with a light reflecting section having light reflectivity;
   a support section;
   a coupling section adapted to couple the movable plate rotatably to the support section, and composed mainly of a plurality of beams parallel to each other; and
   a magnet disposed on an opposite surface of the movable plate to the light reflecting section, wherein the plurality of beams of the coupling section is arranged side-by-side in a direction parallel to the light reflecting section and has a shape having a total length of widths of the respective beams and distances between adjacent ones of the beams in the direction parallel to the light reflecting section gradually increasing in a direction from a side of the light reflecting section toward a side of the magnet in a cross-sectional view perpendicular to a rotational axis of the movable plate.

2. The light deflecting element according to claim 1, wherein
the plurality of beams includes a first beam and a second beam opposed to each other via the rotational axis of the movable plate, and parallel to each other, and
the first beam and the second beam have shapes tilted so that a distance from each other gradually increases in a direction from the side of the light reflecting section toward the side of the magnet in the cross-sectional view perpendicular to the rotational axis of the movable plate.

3. The light deflecting element according to claim 1, wherein
the movable plate and the coupling section are made of single crystal silicon.

4. The light deflecting element according to claim 3, wherein
both plate surfaces of the movable plate are each formed of a plane of the single crystal silicon, and
the coupling section is formed of a plane and a plane of the single crystal silicon.

5. The light deflecting element according to claim 1, wherein
the coupling section has surfaces formed so as to be in the same planes with both plate surfaces of the movable plate, respectively.

6. The light deflecting element according to claim 1, wherein
the movable plate has a portion having a width gradually decreasing in a direction from the side of the light reflecting section toward the side of the magnet in a cross-sectional view perpendicular to the rotational axis of the movable plate.

7. The light deflecting element according to claim 1, wherein
the movable plate has a recessed section on a surface opposite to the light reflecting section, and
at least a part of the magnet is disposed inside the recessed section.

8. The light deflecting element according to claim 1, wherein
the magnet is a permanent magnet.

9. A light deflector comprising:
the light deflecting element according to claim 1.

10. An image forming device comprising:
a light emitting section adapted to emit light; and
the light deflector according to claim 9,
wherein the image forming device forms an image by scanning the light, which is emitted from the light emitting section, with the light deflector.

* * * * *